US011667171B2

(12) United States Patent
Birkland et al.

(10) Patent No.: US 11,667,171 B2
(45) Date of Patent: Jun. 6, 2023

(54) METHOD AND SYSTEM FOR ESTIMATING SURFACE ROUGHNESS OF GROUND FOR AN OFF-ROAD VEHICLE TO CONTROL STEERING

(71) Applicant: Deere & Company, Moline, IL (US)

(72) Inventors: Christopher D. Birkland, Indianola, IA (US); Tyler D. Schleicher, Ankeny, IA (US)

(73) Assignee: Deere & Company, Moline, IL (US)

(*) Notice: Subject to any disclaimer, the term of this patent is extended or adjusted under 35 U.S.C. 154(b) by 168 days.

(21) Appl. No.: 16/946,633

(22) Filed: Jun. 30, 2020

(65) Prior Publication Data

US 2021/0283973 A1 Sep. 16, 2021

Related U.S. Application Data

(60) Provisional application No. 62/988,685, filed on Mar. 12, 2020.

(51) Int. Cl.
*B60G 17/0195* (2006.01)

(52) U.S. Cl.
CPC .. *B60G 17/0195* (2013.01); *B60G 2400/0512* (2013.01); *B60G 2400/0513* (2013.01); *B60G 2400/204* (2013.01); *B60G 2400/41* (2013.01)

(58) Field of Classification Search
CPC ............. B60W 10/20; B60W 2520/10; B60W 2520/105; B60W 2520/16;
(Continued)

(56) References Cited

U.S. PATENT DOCUMENTS 7,272,474 B1 9/2007 Stentz et al.
8,265,826 B2 9/2012 Feller et al.
(Continued)

FOREIGN PATENT DOCUMENTS

AU 2013303992 A1 * 4/2015 ............. B60K 28/16
AU 2013303992 A1 4/2015
(Continued)

OTHER PUBLICATIONS

Szczodrak, et al.; Road surface roughness estimation employing integrated position and acceleration sensor; Sep. 20, 2017; IEEE; pp. 228-231 (https://ieeexplore.ieee.org/document/8166869) (Year: 2017).*

(Continued)

*Primary Examiner* — Atul Trivedi

(57) ABSTRACT

A method and system for estimating surface roughness of a ground for an off-road vehicle to control steering of a vehicle, an implement, or both, comprises detecting motion data of an off-road vehicle traversing a field or work site during a sampling interval. A first sensor is adapted to detect pitch data of the off-road vehicle for the sampling interval to obtain a pitch acceleration. A second sensor is adapted to detect roll data of the off-road vehicle for the sampling interval to obtain a roll acceleration. An electronic data processor or surface roughness index module determines or estimates a surface roughness index based on the detected motion data, pitch data and roll data for the sampling interval. The surface roughness index can be displayed on the graphical display to a user or operator of the vehicle.

16 Claims, 11 Drawing Sheets

(58) Field of Classification Search

CPC ......... B60W 2520/18; B60W 2556/50; B60W 40/06; B60W 50/14; B60W 2050/146; B60W 2300/15; B60W 2710/20; B60G 17/0195; B60G 2400/0512; B60G 2400/0513; B60G 2400/204; B60G 2400/41; B62D 6/006; A01B 79/005; A01B 63/1112; E02F 9/2087; E02F 9/262

USPC ............................................................ 701/36

See application file for complete search history.

(56) References Cited

U.S. PATENT DOCUMENTS 8,340,438 B2 12/2012 Anderson
9,516,802 B2 12/2016 Zemenchik
9,615,501 B2 4/2017 Pickett et al.
9,693,496 B2 7/2017 Tevs et al.
9,708,001 B2 7/2017 Arakane et al.
9,740,208 B2 8/2017 Sugumaran et al.
10,114,376 B2 10/2018 Kini et al.
10,119,830 B2 11/2018 Sakai et al.
10,126,136 B2 * 11/2018 Iagnemma ........... G05D 1/0088
10,219,421 B2 3/2019 Achen et al.
10,398,096 B2 9/2019 Hassanzadeh et al.
10,408,645 B2 9/2019 Blank et al.
10,448,555 B2 10/2019 Foster et al.
10,800,423 B2 10/2020 Schleicher
10,962,982 B2 3/2021 Fridman
10,981,573 B2 4/2021 Herrera
10,988,142 B1 * 4/2021 Mehrotra ............ B60W 40/068
11,029,681 B2 6/2021 Rulseh et al.
2003/0055549 A1 3/2003 Barta et al.
2008/0269988 A1 10/2008 Feller et al.
2011/0077028 A1 3/2011 Wilkes, III et al.
2013/0032363 A1 2/2013 Curry et al.
2015/0088381 A1 3/2015 Imamura et al.
2015/0088802 A1 3/2015 Jeon et al.
2015/0237795 A1 8/2015 Koch et al.
2016/0029547 A1 2/2016 Casper et al.
2016/0031444 A1 2/2016 Fairgrieve et al.
2016/0334798 A1 11/2016 Foster et al.
2017/0309093 A1 10/2017 Feng
2017/0363430 A1 12/2017 Al-Dahle et al.
2018/0220577 A1 8/2018 Posselius et al.
2019/0031231 A1 * 1/2019 George ................ B62D 5/0463
2019/0047573 A1 2/2019 Herrera
2019/0079539 A1 3/2019 Sridhar et al.
2019/0129435 A1 5/2019 Madsen et al.
2019/0183036 A1 6/2019 Leimkuehler et al.
2019/0256102 A1 8/2019 Schleicher
2019/0387658 A1 12/2019 Henry
2020/0005474 A1 1/2020 Ferrari et al.
2020/0029489 A1 1/2020 Bertucci et al.
2020/0037491 A1 2/2020 Schoeny et al.
2020/0063401 A1 * 2/2020 Sherlock ............... E02F 9/2045
2020/0079381 A1 * 3/2020 Lombrozo ............. B62D 6/003
2020/0270824 A1 8/2020 Nagayama et al.
2020/0285228 A1 9/2020 Rulseh et al.
2020/0317018 A1 10/2020 Nong
2020/0393566 A1 12/2020 Zeng et al.
2021/0048290 A1 2/2021 Henry
2021/0055740 A1 2/2021 Sridhar et al.
2021/0188284 A1 * 6/2021 Hassel .................. B60W 10/20
2021/0261157 A1 8/2021 Pazhayampallil et al.
2021/0274700 A1 9/2021 Birkland et al.
2021/0276565 A1 9/2021 Birkland et al.
2021/0282310 A1 * 9/2021 Birkland ............... E01C 19/004
2021/0283973 A1 * 9/2021 Birkland ............... B60W 40/06
2021/0284171 A1 * 9/2021 Birkland ............. B60W 30/143
2021/0284172 A1 * 9/2021 Birkland .............. B60W 40/112

FOREIGN PATENT DOCUMENTS

CN 103196823 A 7/2013
CN 103196823 A * 7/2013
CN 203259455 U * 10/2013
CN 203259455 U 10/2013
CN 112519785 A * 3/2021 ............ B60W 10/18
CN 112519785 A 3/2021
CN 114787014 A * 7/2022 .......... B60W 40/068
DE 19537257 A1 * 4/1996 ....... B60G 17/01933
DE 19537257 A1 4/1996
DE 19844090 A1 4/1999
DE 19844090 A1 * 4/1999 .............. B60T 8/172
DE 10107862 A1 9/2002
DE 10107862 A1 * 9/2002 ............. B60C 11/00
EP 1203928 A1 * 5/2002 ............. G01B 11/30
EP 1203928 A1 5/2002
EP 2218621 A1 8/2010
EP 2218621 A1 * 8/2010 .............. B60T 8/172
EP 3357316 A1 8/2018
EP 3527057 A1 8/2019
EP 3878255 A1 * 9/2021 ........... A01B 69/008
EP 3878255 A1 9/2021
EP 3878256 A1 * 9/2021 ........... A01B 79/005
EP 3878256 A1 9/2021
EP 3878257 A1 * 9/2021 .......... B60W 30/143
EP 3878257 A1 9/2021
EP 3878258 A1 9/2021
EP 3878258 A1 * 9/2021 ............ B60W 10/04
JP H1062311 A * 3/1998 ............ G01M 17/00
JP H1062311 A 3/1998
JP H11189063 A 7/1999
JP H11189063 A * 7/1999 ............. B60K 23/04
JP 2000131043 A 5/2000
JP 2000131043 A * 5/2000 ............. G01B 11/30
JP 2021165055 A 10/2021
JP 2021165055 A * 10/2021 ............... B60Q 9/00
WO WO2014027111 A1 2/2014
WO WO-2014189059 A1 * 11/2014 .......... B60W 40/064
WO WO2014189059 A1 11/2014
WO WO-2019142868 A1 * 7/2019 ........... B60C 11/246
WO WO2019142868 A1 7/2019
WO WO2020116352 A1 6/2020
WO WO-2020116352 A1 * 6/2020 ............ B60W 40/06

OTHER PUBLICATIONS

USPTO Non-Final Office Action issued in Utility U.S. Appl. No. 16/946,849 dated Sep. 21, 2021.

Badua et al., Influence of Planter Downforce Setting and Ground Speed on Seeding Depth and Plant Spacing Uniformity of Corn, 14th International Conference on Precision Agriculture, Jun. 24-Jun. 27, 2018, pp. 1-13, Montreal, Quebec, Canada.

Ciampitti, Ignacio, and Lucas Haag. "Planter Downforce Technology for Uniform Seeding Depth." Kansas State University Agricultural Experiment Station and Cooperative Extension Service. Mar. 2017. Retrieved Jul. 6, 2020. Retrieved from the Internet: < https://bookstore.ksre.ksu.edu/pubs/MF3331.pdf>.

Extended European Search Report and Written Opinion issued in European Patent Application No. 21157567.5, dated Jul. 20, 2021, in 08 pages.

Extended European Search Report and Written Opinion issued in European Patent Application No. 21157568.3, dated Jul. 22, 2021, in 08 pages.

USPTO Non-Final Office Action issued in Utility U.S. Appl. No. 16/946,629 dated May 19, 2022.

USPTO Non-Final Office Action issued in U.S. Appl. No. 16/946,629 dated May 19, 2022.

* cited by examiner

Figure 2E:
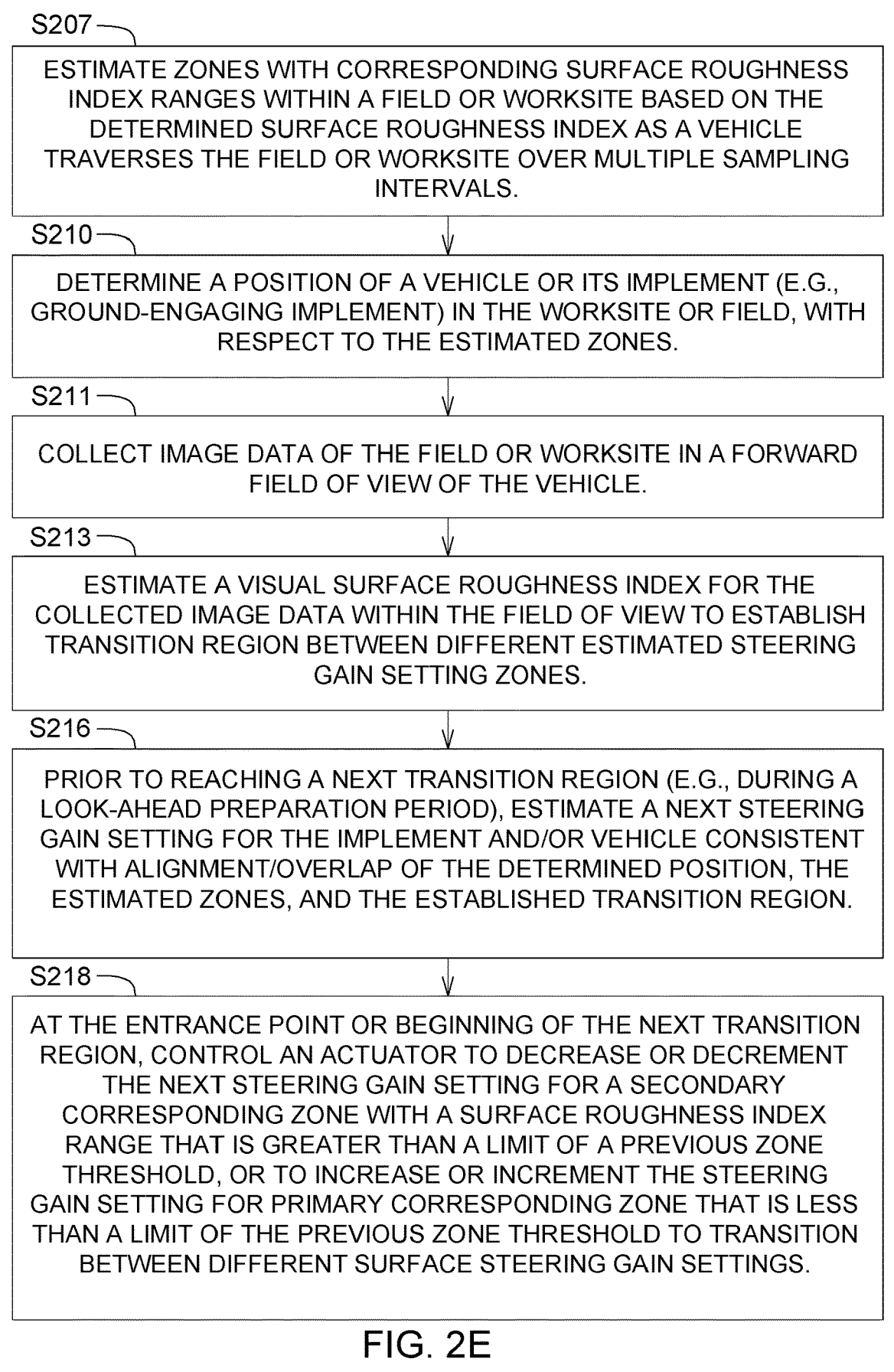

S207

ESTIMATE ZONES WITH CORRESPONDING SURFACE ROUGHNESS INDEX RANGES WITHIN A FIELD OR WORKSITE BASED ON THE DETERMINED SURFACE ROUGHNESS INDEX AS A VEHICLE TRAVERSES THE FIELD OR WORKSITE OVER MULTIPLE SAMPLING INTERVALS.

S210

DETERMINE A POSITION OF A VEHICLE OR ITS IMPLEMENT (E.G., GROUND-ENGAGING IMPLEMENT) IN THE WORKSITE OR FIELD, WITH RESPECT TO THE ESTIMATED ZONES.

S211

COLLECT IMAGE DATA OF THE FIELD OR WORKSITE IN A FORWARD FIELD OF VIEW OF THE VEHICLE.

S213

ESTIMATE A VISUAL SURFACE ROUGHNESS INDEX FOR THE COLLECTED IMAGE DATA WITHIN THE FIELD OF VIEW TO ESTABLISH TRANSITION REGION BETWEEN DIFFERENT ESTIMATED STEERING GAIN SETTING ZONES.

S216

PRIOR TO REACHING A NEXT TRANSITION REGION (E.G., DURING A LOOK-AHEAD PREPARATION PERIOD), ESTIMATE A NEXT STEERING GAIN SETTING FOR THE IMPLEMENT AND/OR VEHICLE CONSISTENT WITH ALIGNMENT/OVERLAP OF THE DETERMINED POSITION, THE ESTIMATED ZONES, AND THE ESTABLISHED TRANSITION REGION.

S218

AT THE ENTRANCE POINT OR BEGINNING OF THE NEXT TRANSITION REGION, CONTROL AN ACTUATOR TO DECREASE OR DECREMENT THE NEXT STEERING GAIN SETTING FOR A SECONDARY CORRESPONDING ZONE WITH A SURFACE ROUGHNESS INDEX RANGE THAT IS GREATER THAN A LIMIT OF A PREVIOUS ZONE THRESHOLD, OR TO INCREASE OR INCREMENT THE STEERING GAIN SETTING FOR PRIMARY CORRESPONDING ZONE THAT IS LESS THAN A LIMIT OF THE PREVIOUS ZONE THRESHOLD TO TRANSITION BETWEEN DIFFERENT SURFACE STEERING GAIN SETTINGS.

FIG. 2E 501
542
505
504
517
516
506
512
520
508
515
518
507
Pump
(503)
519
509
500
510
Container
(502)
To Data Ports (16)

METHOD AND SYSTEM FOR ESTIMATING SURFACE ROUGHNESS OF GROUND FOR AN OFF-ROAD VEHICLE TO CONTROL STEERING

RELATED APPLICATION

This document (including the drawings) claims priority and the benefit of the filing date based on U.S. provisional application No. 62/988,685, filed Mar. 12, 2020, under 35 U.S.C. § 119 (e), where the provisional application is hereby incorporated by reference herein.

FIELD

This disclosure relates to a method and system for estimating surface roughness of ground for an off-road vehicle to control to control steering.

BACKGROUND

An off-road vehicle may be operated in fields or work sites where natural or artificial irregularities in the surface of the ground can impact the performance of the off-road vehicle, or its implement. For example, if a field has been subjected to earth-moving operations or deep tillage, surface irregularities, like ruts, may cause the vehicle's tires or tracks to deviate from the target path plan. Further, irregularities may contribute to operator fatigue or annoyance because of increased vibrations in the cab of the vehicle. In some cases, crop residue, surface soil, vegetation, or poor visibility (e.g., fog), can conceal surface irregularities to the operator or optical sensors of the vehicle.

In some background art, an automatic guidance system may be used to guide a vehicle, or its implement to track a path plan. However, certain ground or soil conditions can lead to variance of the off-road vehicle, or its implement, from tracking the target path plan, regardless of whether the automatic guidance system is fully operational. For example, in response to ground surface irregularities, the vehicle and implement may experience unwanted deviations in heading or yaw that tend to increase required application of crop inputs, such as seeds, fertilizer, nutrients, fungicides, pesticides, herbicides, or other treatments to cover fully a filed or work area. The application of crop inputs could vary from target settings, specifications or target tolerances. Thus, there is a need a method and system for estimating surface roughness of ground for an off-road vehicle to control steering of the vehicle.

SUMMARY

In accordance with one embodiment, a method and system is configured to estimate surface roughness of ground for an off-road vehicle to control steering. Motion data is detected for an off-road vehicle traversing a field or work site during a sampling interval. The motion data may comprise ground speed (e.g., ground velocity) of the off-road vehicle. A location-determining receiver provides a respective position of the vehicle, or its implement, for the sampling interval. A first sensor is adapted to detect pitch data of the off-road vehicle for the sampling interval (e.g., to obtain pitch acceleration). A second sensor is adapted to detect roll data of the off-road vehicle for the same sampling interval (e.g., to obtain roll acceleration). An electronic data processor or surface roughness index estimator module determines or estimates a surface roughness index for a cell or zone of the field or work area based on the detected motion data, pitch data and roll data for the sampling interval. The surface roughness index can be displayed by respective position (e.g., two or three dimensional coordinates) on the graphical display to a user or operator of the vehicle, or stored, regularly, in a data storage device to create a data map of surface roughness index versus respective positions (e.g., traversed by the vehicle) in the field or work site.

In accordance with another aspect of the disclosure, the electronic data processor or surface roughness index estimator module is configured to estimate zones (e.g., cells) with corresponding surface roughness index ranges within a field or work site based on the determined surface roughness index as a vehicle traverses or traversed the field or work site over multiple sampling intervals. Further, the electronic data processor or surface roughness index estimator module can generate a graphical display that illustrates the estimated zones of corresponding surface roughness or index ranges within the field or work site.

BRIEF DESCRIPTION OF THE DRAWINGS

FIG. 2E is a flow chart of a fifth embodiment of a method for estimating surface roughness of ground for an off-road vehicle to control steering of the off-road vehicle, its implement, or both.

DETAILED DESCRIPTION

Figure 1A:
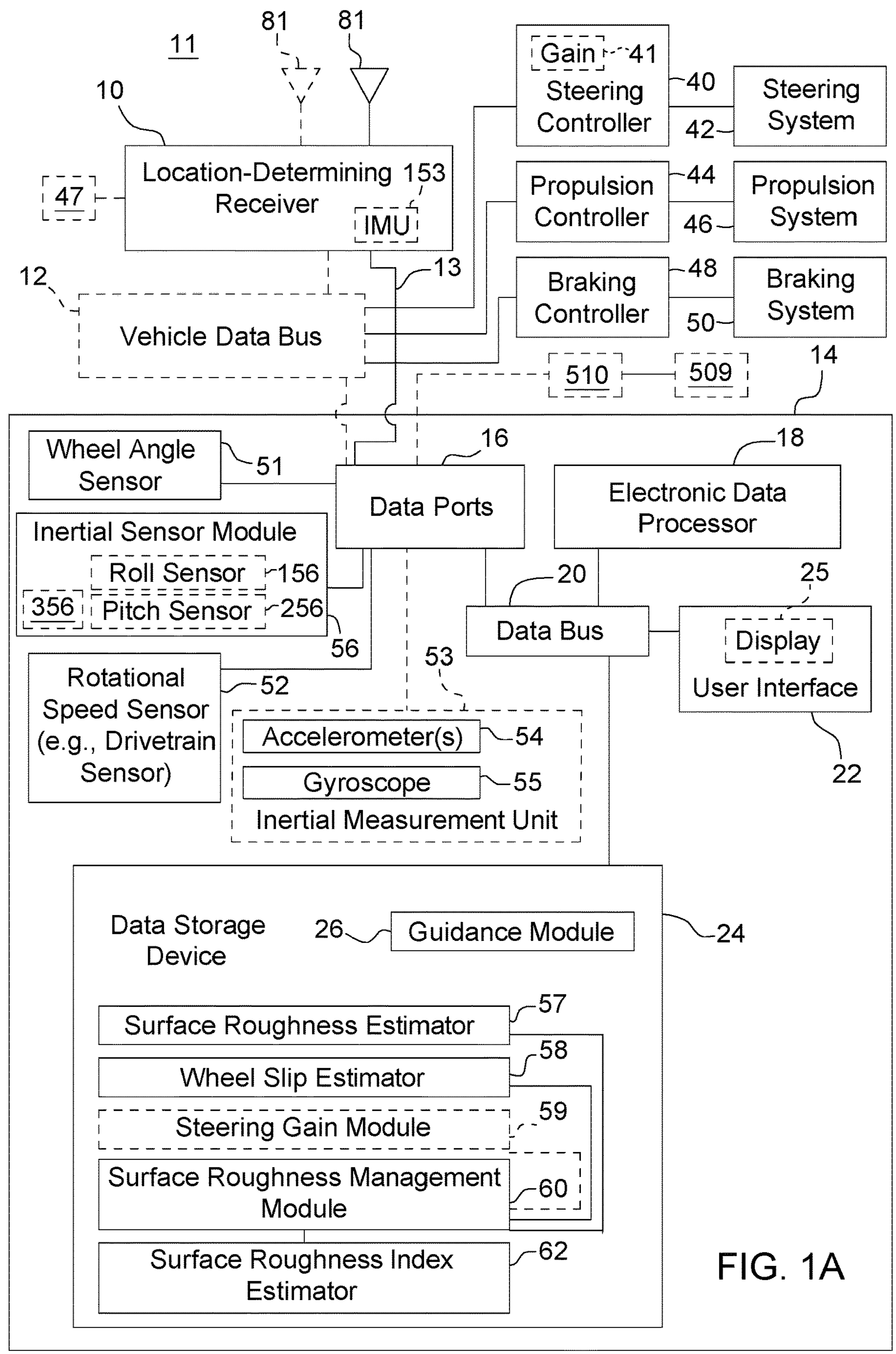
FIG. 1A is a block diagram of one embodiment of a system for estimating surface roughness of ground for an off-road vehicle to control steering of the off-road vehicle, its implement, or both.

FIG. 1A is one embodiment of a block diagram of a system 11 for estimating surface roughness of ground (e.g., one or more zones or cells of the ground) for an off-road vehicle (e.g., 82 in FIG. 4) to control steering of: (a) the off-road vehicle, or (b) any steerable implement coupled to the off-road vehicle, or (c) both the off-road vehicle and the steerable implement coupled to the off-road vehicle. In FIG. 1A, the system 11 is capable of detecting motion data and attitude data by one or more sensors, such as one or more location-determining receivers (10, 110), an inertial sensor module 56, one or more accelerometers, 54, a gyroscope 55, or an internal measurement unit (IMU) (53, 153) that use accelerometers or gyroscopes. In one example, the system 11 may send a surface roughness indicator (e.g., surface roughness index value) or data message to an operator or end user of the detection system 11 via a user interface 22 that is incorporated into a vehicle, such as a display 25. In an alternate embodiment, the user interface 22 and display 25 may be located remotely from the vehicle via a wireless link to support remote control or tele-operation of the vehicle by the operator.

In one embodiment, the system 11 comprises an electronic data processing system 14 that is coupled to a location-determining receiver 10 directly, or via a vehicle data bus 12. The optional connection via vehicle data bus 12 is shown in dashed lines because it is optional and the connection between the electronic data processing system 14 and location-determining receiver 10 may be direct, as indicated by transmission line 13, which can be used separately or cumulatively with the interconnection via the vehicle data bus 12. The location-determining receiver 10 may have an antenna 81 mounted on the vehicle, on the implement or both.

In an alternate embodiment, a first location-determining receiver 10 and its antenna 81 are on or in the vehicle (e.g., 82 in FIG. 4); a second location-determining receiver 110 (in FIG. 1B) and its antenna are on or in the implement (e.g., 83 in FIG. 4), where both the first location-determining receiver 10 and the second-location determining receiver 110 may comprise satellite navigation receivers (with or without differential correction data) or other location-determining receivers.

In one embodiment, the electronic data processing system 14 comprises an electronic data processor 18, one or more data ports 16, a user interface 22 and a data storage device 24 coupled to a data bus 20. The electronic data processor 18 may comprise a processor, a microcontroller, a digital signal processor, an application specific integrated circuit (ASIC), a programmable logic array, a programmable logic device, a logic circuit, an arithmetic logic unit, a Boolean logic device, or another data processing device. The data storage device 24 may comprise one or more of the following: electronic memory, nonvolatile electronic memory, an optical data storage device, a magnetic data storage device, or other device for storing digital or analog data.

In one embodiment, the data storage device 24 may store, retrieve, read and write one or more of the following items: a guidance module 26, a surface roughness estimator 57, a wheel slip estimator 58, a steering gain module 59 (e.g., steering gain estimator), a surface roughness management module 60, and a surface roughness index estimator 62. A module means software, electronics, or both, where software can include software instructions, executable files, data structures, and libraries, among other things.

As used in this document, configured to, adapted to and arranged to may refer any of the following items: (1) software or program instructions that are stored in the data storage device 24 or other data storage and executable by the data processor 18 to perform certain functions, software, (2) software or embedded firmware that are stored in the location-determining receiver (10, 110) or its memory or data storage to perform certain functions, or (3) electronic, electrical circuits or modules that can perform substantially equivalent functions to the software, embedded firmware or program instructions.

Any data port 16 may comprise a data transceiver, buffer memory, or both. The user interface 22 may comprise one or more of the following: a display 25 (e.g., display), a touch screen display, a keypad, a keyboard, a control panel, a pointing device (e.g., electronic mouse), or another device for entry or output of data from the data processing system 14.

In one embodiment, a wheel angle sensor 51, one or more accelerometers 54, an inertial sensor module 56, a rotational speed sensor 52, an optional IMU (53, 153) and a data bus 20 are coupled to the data ports 16. The electronic data processing system 14 communicates to data ports 16 directly, or indirectly via the data bus 20. Further, the data ports 16 support the communication of data messages to, from or between, or among any of the following: the electronic data processor 18, the data storage device 24, any modules, data, files, libraries, or software within the data storage device 24, the location-determining receiver (10, 110) the wheel angle sensor 51, the inertial sensor module 56, one or more accelerometers 54, a rotational speed sensor 52, an optional IMU and a data bus 20.

In one embodiment, the optional IMU 53 is a separate device, whereas in other embodiments, the IMU 153 is integral with the location-determining receiver 10. The optional separate IMU 53 comprises one or more accelerometers 54 and a gyroscope 55, where the accelerometers 54 may be arranged on orthogonal axes with respect to each other to facilitate detection of vehicle attitude, such as roll angle, pitch angle and yaw angle of a vehicle.

In FIG. 1A, the steering controller 40, the propulsion controller 44 and the braking controller 48 are coupled to the vehicle data bus 12. For example, the data processing system 14 can communicate with the steering controller 40, the propulsion controller 44 and the braking controller 48, and vice versa. In one embodiment, the steering controller 40 is coupled to the vehicle steering system 42, such as an actuator, an electrical motor or electrohydraulic device that is mechanically coupled to a steering mechanism (e.g., rack-and-pinion or Ackerman steering system) for controlling the angular orientation of one or more wheels about a generally vertical axis. The steering controller 40 may operate with a steering gain or gain 41 that controls a sensitivity or aggressiveness of steering commands, such as steering commands that can be expressed or represented as any of the following: (a) maximum angular displacement per unit time, (b) a maximum yaw angular velocity, (c) target range for yaw angular velocity, (d) a maximum yaw angular acceleration, and target range for yaw angular acceleration.

In one embodiment, the propulsion controller 44 may comprise an electronic engine controller for controlling a throttle or fuel metering system of a propulsion system 46, such as internal combustion engine. In another embodiment, a propulsion controller 44 may comprise an inverter or motor controller for controlling a propulsion system 46, such as a drive motor of a hybrid or electric vehicle. In one embodiment, the braking controller 48 interfaces with a braking system 50, such as hydraulic braking system, an electrohydraulic braking system, a cable braking system, or an electromechanical braking system to stop or decelerate the vehicle.

Figure 1B:
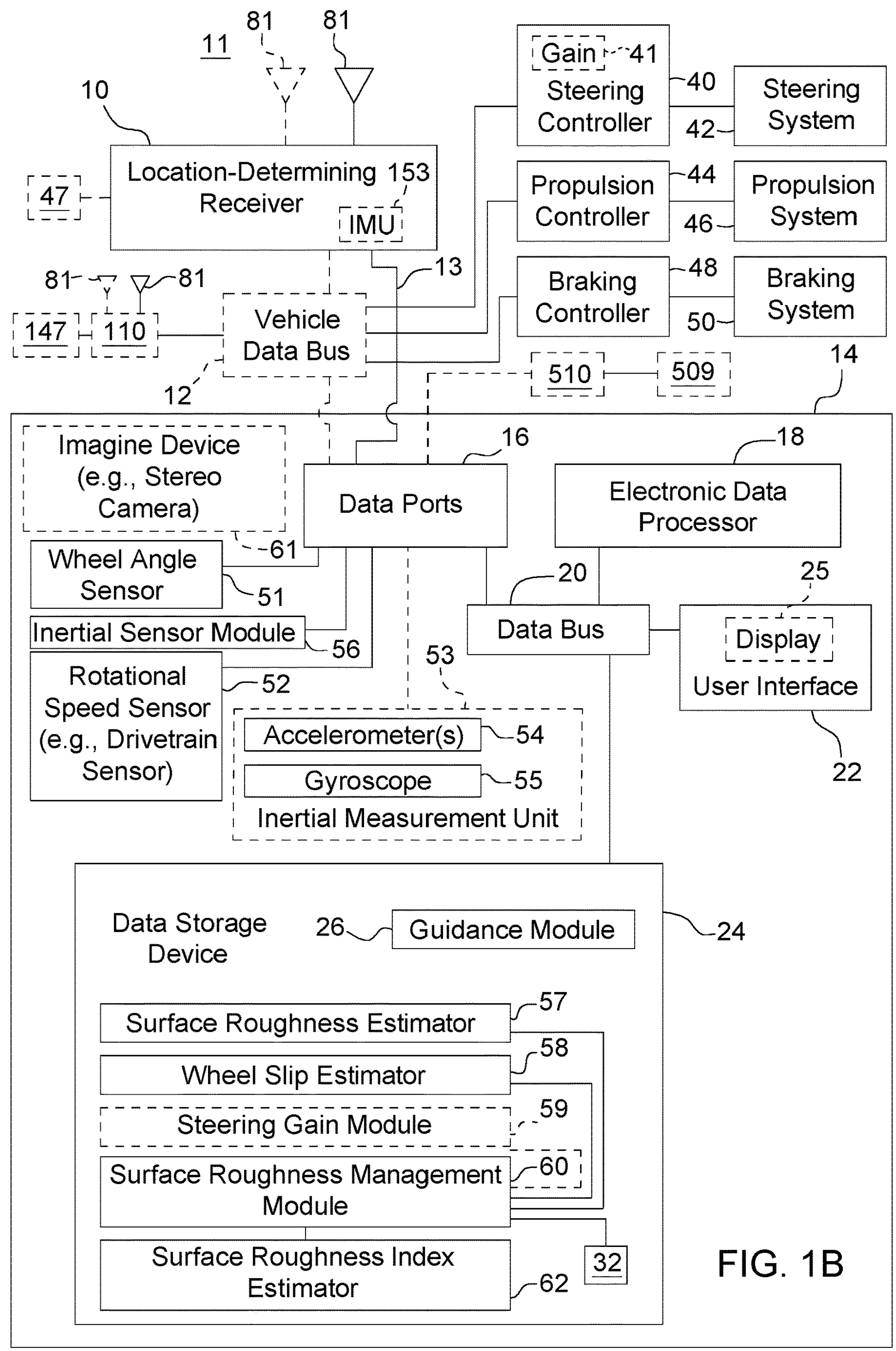
FIG. 1B is a block diagram of another embodiment of a system for estimating surface roughness of ground for an off-road vehicle to control steering of the off-road vehicle, its implement, or both.

In FIG. 1A and FIG. 1B, an optional implement steering controller 510 is coupled to the data port 16 or the data processing system 14. In turn, the optional implement steering controller 510 is electrically coupled to the optional implement steering actuator 509. The optional implement steering controller 510 and the optional implement steering actuator 509 are indicated in dashed lines because they are optional.

In one embodiment, the optional implement steering controller 510 is coupled to the implement steering actuator 509. The implement steering actuator 509 may comprise an actuator, an electrical motor or electrohydraulic device that is mechanically coupled to a steering mechanism (e.g., rack-and-pinion or Ackerman steering system) for controlling the angular orientation of one or more wheels of the implement about a generally vertical axis. The optional implement steering controller 510 may operate with a steering gain or gain 41 that controls a sensitivity or aggressiveness of implement steering commands, such as implement steering commands that can be expressed or represented as any of the following: (a) maximum angular displacement per unit time, (b) a maximum yaw angular velocity, (c) target range for yaw angular velocity, (d) a maximum yaw angular acceleration, and target range for yaw angular acceleration.

Further, the electronic data processor 18, the steering gain module 59, and/or the surface roughness management module 60 may determine, generate and send steering gain data to the vehicle steering controller 40, to the implement steering controller 510, or to both to control one or more actuators, such as vehicle steering actuators (e.g., 42), implement steering actuators (e.g., 509), or both simultaneously. Accordingly, steering gain data for the vehicle steering controller 40 or the vehicle steering system 42 may be referred to as steering gain setting, a target steering gain, or more specifically a vehicle steering gain setting or a vehicle target steering gain. Similarly, steering gain data for the implement steering controller 510 or the implement steering actuator 509 may be referred to as steering gain setting, a target steering gain, or more specifically an implement steering gain setting or an implement target steering gain.

In one configuration, the guidance module 26 controls the vehicle to track or follow a path plan, consistent with the gain 41 (e.g., commanded steering gain or target steering gain) provided by the steering gain module 59. Further, a path plan may comprise a generally linear path plan, a curved path plan, a contour path plan, a spiral path plan, a coverage area path plan, or other path plan, such as any of the path plans illustrated in FIG. 3A or FIG. 3B. For example, a path plan may comprise any of the following: one or more linear path segments or rows 302, curved path segments or turns 303, such as an end turn, a key-hole end turn, a loop end turn, a row-skipping end turn. In the automated guidance mode, in certain vehicle configurations the guidance module 26 can control the steering, propulsion, and braking of the vehicle. For example, in the automated guidance mode, the guidance module 26 can communicate with one or more of the following controllers to direct and guide the vehicle: steering controller 40, propulsion controller 44 and braking controller 48.

In FIG. 1A in accordance with one embodiment, the system 11 comprises one or more location-determining receivers 10 for estimating a position, motion, and attitude data of the vehicle (82 in FIG. 4), or its implement (e.g., 83 in FIG. 4), or both. As used in the disclosure, attitude refers to roll angle, pitch angle and yaw angle, or motion data associated with roll angle, pitch angle and yaw angle. As used in the disclosure, motion data comprises velocity data (e.g., speed data), acceleration data, or both. The velocity data and acceleration data may be expressed as vectors. As used in the disclosure, a yaw angle or heading can refer to: (1) an angular direction of travel of the vehicle with reference to due North or magnetic North, or (2) a yaw or yaw angle of the vehicle with reference to coordinate system, such as a Cartesian coordinate system.

In an alternate embodiment, a first location-determining receiver 10 or its antenna 81 is mounted on the vehicle for estimating a position, motion and/or attitude data of the vehicle (82 in FIG. 4) and a second location-determining receiver 110 is mounted on the implement (e.g., 83 in FIG. 4) for estimating a position, motion and/or attitude data of the implement that is coupled to the vehicle; position, motion and attitude data is available for the vehicle, its implement or both for processing by the electronic data processor 18 to execute the software instructions associated with modules, estimators, or other components within the data storage device 24.

In one embodiment, the location-determining receiver (10, 110) (e.g., satellite navigation receiver), alone or together with a wireless communications device, has a pair of antennas 81 that are spaced apart with a known orientation. Further, the location-determining receiver (10, 110) or the electronic data processor 18 can couple (e.g., selectively or switchably in rapid succession during the same epoch) either antenna 81 of the pair of antennas 81 to support estimation of the attitude of the pair of antennas 81 when the vehicle or implement is at a fixed position or substantially the same position. For example, the pair of antennas 81 are spaced apart by a known distance on an axis with a known or fixed orientation (e.g., compound angular offset in one or more dimensions) to the longitudinal axis (in the direction of travel of the vehicle) and vertical axis of the vehicle. The location-determining receiver (10, 110) may estimate a first position (e.g., in three dimensions) of the first antenna 81 and a second position (e.g., in three dimensions) of the second antenna 81. Accordingly, the data processor or the location-determining receiver (10, 110) may estimate the precise attitude (e.g., yaw data, roll data, or both) of the vehicle, or its implement, based on the first position and the second position for the same epoch or measurement period, with or without augmentation by the correction data.

In one embodiment, as illustrated in FIG. 1B, a wireless communications device (47, 147) is coupled to a data port of a location-determining receiver (10, 110) or a vehicle data bus 12 to augment the received satellite signals and associated carrier phase measurements of the received satellite signals (e.g., of at least four satellites) at the location-determining receiver (10, 110). For example, the wireless communications device (47, 147) may comprise a separate receiver or transceiver (e.g., satellite, cellular, or wireless device) may receive the correction data or differential correction data via a wireless signal transmitted from a satellite or a terrestrial base station (e.g., real-time kinematic (RTK) base station). The wireless communications device (47, 147) may receive correction data from one or more of the following sources of correction data: (a) differential correction data from local base stations or local reference receivers operating in a real-time-kinematic (RTK) mode, (b) correction data associated with a precise-point-position (PPP) satellite navigation system with precise orbital correction data for satellites and satellite clocks in a PPP mode, (c) correction data applicable to a satellite navigation system, and correction data (e.g., carrier-phase offset or position vector offset) provided from a hub or central processing center in communication a network of reference satellite navigation receivers, and (d) other correction data is commercially available from local, wide-area, regional, or global correction or satellite data augmentation services.

In one embodiment, the location-determining receiver (10, 110) provides one or more of the following types of data for a vehicle, and/or its implement: yaw data (e.g., heading data), roll data, pitch data, position data, velocity data, and acceleration data (e.g., as vectors or in two or three dimensional coordinates). The location-determining receiver (10, 110) may comprise a satellite navigation receiver, a Global Navigation Satellite System (GNSS) receiver, a Global Positioning System (GPS) receiver, or another receiver for determining position data, motion data or attitude data. In one embodiment, a location-determining receiver (10, 110) provides location data, path heading data, vehicle heading data, velocity data, and acceleration data along target path or path plan to the data processing system 14 or guidance module 26.

In one embodiment, an optional separate inertial measurement unit 53 (IMU) may be separate from the location-determining receiver 10 or an optional integral IMU 153 may be integrated with the location determining receiver 10. The optional nature of the separate IMU 53 and the integral IMU 153 is indicated by dashed lines in FIG. 1A. The separate IMU 53 or the integral IMU 153 can estimate the attitude, yaw angle, yaw rate, roll, roll rate, pitch angle, pitch rate for the vehicle, or its implement, for instance. The yaw rate may refer to yaw angular velocity, yaw angular acceleration or both; the roll rate may refer to roll angular velocity, roll angular acceleration or both; the pitch rate may refer to pitch angular velocity, pitch angular acceleration or both.

In one configuration, the data processing system 14 comprises an inertial sensor module 41, which may further comprise a roll sensor 156, a pitch sensor 256 and an optional yaw sensor 356. The roll sensor 156, the pitch sensor 256 and the optional yaw sensor 356 are shown in dashed lines to indicate that the sensors are optional. The inertial sensor module 41 may comprise any of the following: a roll sensor, pitch sensor, yaw sensor, one or more accelerometers, a three-axis accelerometer, a gyroscope, an IMU, or another sensor. In general, each sensor, such as roll sensor 156, that is based on accelerometric, gyroscopic, or inertial measurements is subject to bias in their measurements that may arise over time, unless the sensor is calibrated or recalibrated (e.g., by the carrier phase measurements of the location-determining receiver (10, 110).)

In one embodiment, the roll sensor 156 comprises a first accelerometer that is configured to measure roll angle, roll angular velocity, and/or roll angular acceleration of the vehicle. Similarly, the pitch sensor 256 comprises a second accelerometer that is configured to measure pitch angle, pitch angular velocity and/or pitch angular acceleration of the vehicle. In one configuration, the roll sensor 156 and the pitch sensor 256 may provide attitude data and motion data, such as roll data and pitch data, that the electronic data processor 18 can use to determine a surface roughness estimate.

In another embodiment, the inertial sensor module 56, the accelerometers 54, gyroscopes 55 or IMU (53, 153) of the data processing system 14 detect or measure one or more of the following: pitch angle, pitch motion data, roll angle and roll motion data to support the estimation of a surface roughness index for a cell or zone of the field or work area based on the detected motion data, pitch data and roll data for the sampling interval. To determine a reliable or accurate estimate of the surface roughness index, the electronic data processor 18 can estimate the sensor bias to perform calibration of roll sensor data, pitch sensor data, or both.

In one embodiment, a motion sensor is configured to detect motion data of an off-road vehicle traversing a field or work site during a sampling interval. The motion data comprises ground speed or velocity of the off-road vehicle, or its implement. A roll sensor 156 (e.g., accelerometer, inertial sensor, or IMU (53, 153)) is configured to: (a) detect pitch data of the off-road vehicle, or its implement, for the sampling interval to obtain a pitch acceleration, or (b) detect pitch angular acceleration data for the sampling interval. A pitch sensor 256 (e.g., accelerometer, inertial sensor, or IMU (53, 153)) is configured to: (a) detect roll data of the off-road vehicle, or its implement, for the sampling interval to obtain a roll acceleration, or (b) detect roll angular acceleration data of the off-road vehicle, or its implement, for the sampling interval. If the first sensor only detects pitch angle with respect to time, the electronic data processor 18 is configured to derive the pitch angle acceleration from a derivative of the detected pitch angle with respect to time. Similarly, if the second sensor only detects roll angle with respect to time, an electronic data processor 18 is configured to derive the roll angle acceleration from a derivative of the detected roll angle with respect to time.

In an alternate embodiment, the surface roughness estimator 57 can operate in accordance with various techniques that may be applied alternately or cumulatively. Under a first technique, the surface roughness estimator 57 determines estimated surface roughness index based on a measure of roll angle rate variability. Under a second technique, the surface roughness estimator 57 determines estimated surface roughness value or surface roughness index based on a standard deviation of the rate of roll angle change with respect to time.

In one embodiment, a rotational speed sensor 52 is configured to measure a drivetrain-derived wheel speed. A wheel-slip estimator 58 estimates the wheel slip indicator based on drivetrain-derived wheel speed and the estimated velocity, which is provided by the location-determining receiver 10. A wheel-slip estimator 58 estimates the wheel slip indicator based on numerator of drivetrain-derived wheel speed (e.g., sensor wheel speed) minus estimated velocity, which numerator is collectively divided by the drivetrain-derived wheel speed.

In FIG. 1A, a surface roughness estimator 57 is configured to estimate zones with corresponding surface roughness index ranges within a field or work site based on the determined surface roughness index as a vehicle (e.g., 82 in FIG. 4) traverses or traversed the field or work site over multiple sampling intervals. An electronic data processor 18 is configured to generate a graphical display 25 that illustrates the estimated zones of corresponding surface roughness or index ranges within the field or work site. Further, an end user interface 22 is adapted to display 25 the graphical display 25 to a user or operator of the vehicle. In some configurations, the graphical display that illustrates estimates zones of corresponding surface roughness index ranges may resemble FIG. 3A or FIG. 3B, although graphical representations fall within the scope of the disclosure and appended claims.

A location-determining receiver (10, 110) can determine a position of a vehicle (82), or its implement (83, 500), in the field or in the work site with respect to the estimated zones of different corresponding surface roughness index ranges.

In one embodiment, the steering gain module 59 can be operated in accordance with various technique, which may be applied separately or cumulatively. Under a first technique, a steering gain module 59 is configured to estimate a steering gain setting (e.g., target steering gain setting) for the vehicle consistent with alignment and/or overlap of the determined position (e.g., in two or three dimensional coordinates) of the vehicle and the estimated zones. Under a second technique, a steering gain module 59 is configured to estimate steering gain settings (e.g., target steering gain settings) associated with the corresponding implement consistent with alignment and/or overlap of the determined position of the implement and the estimated zones.

Figure 3A:
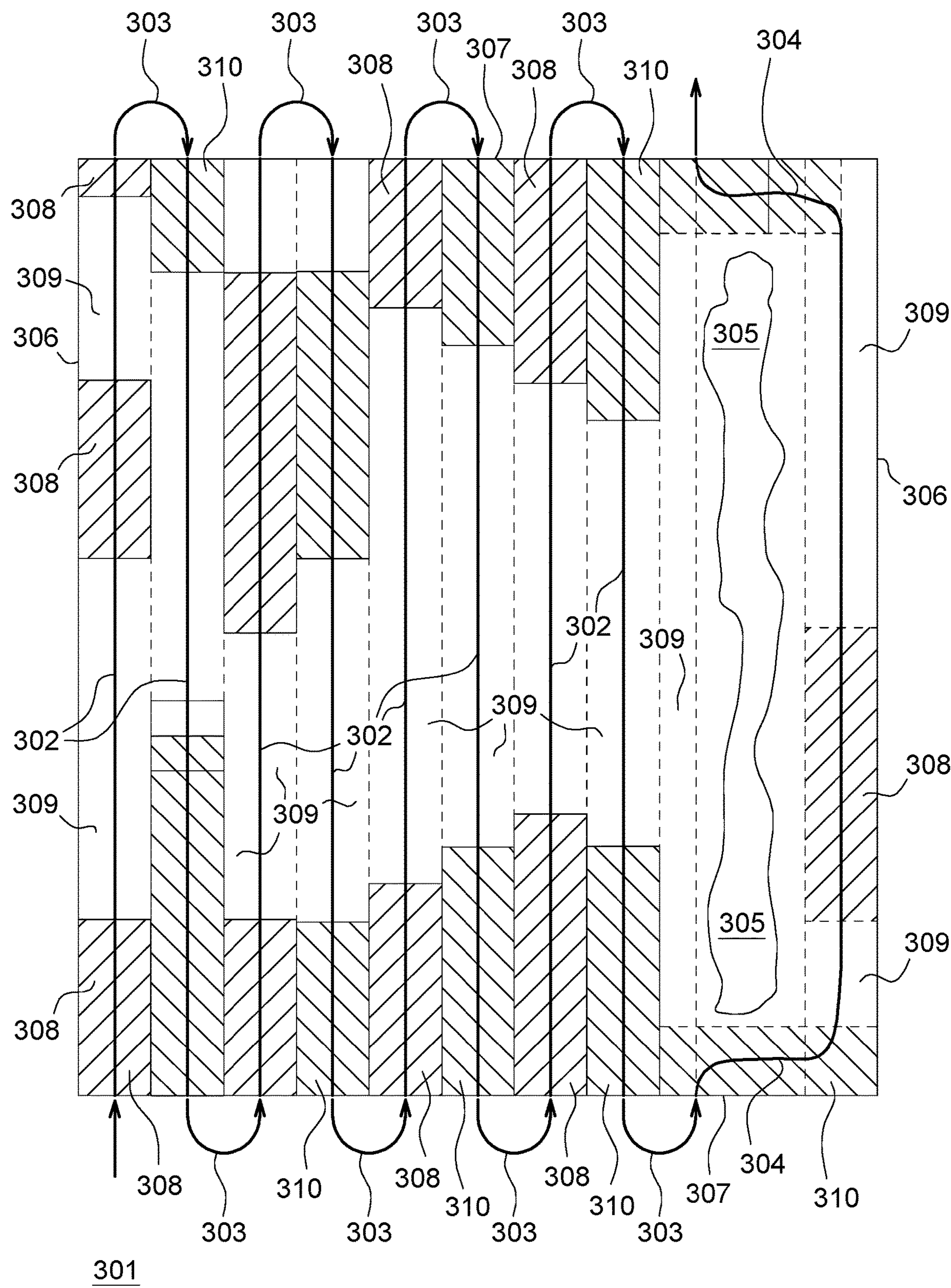
FIG. 3A is a plan view of a first illustrative map of surface roughness zones within a hypothetical field.
Figure 3B:
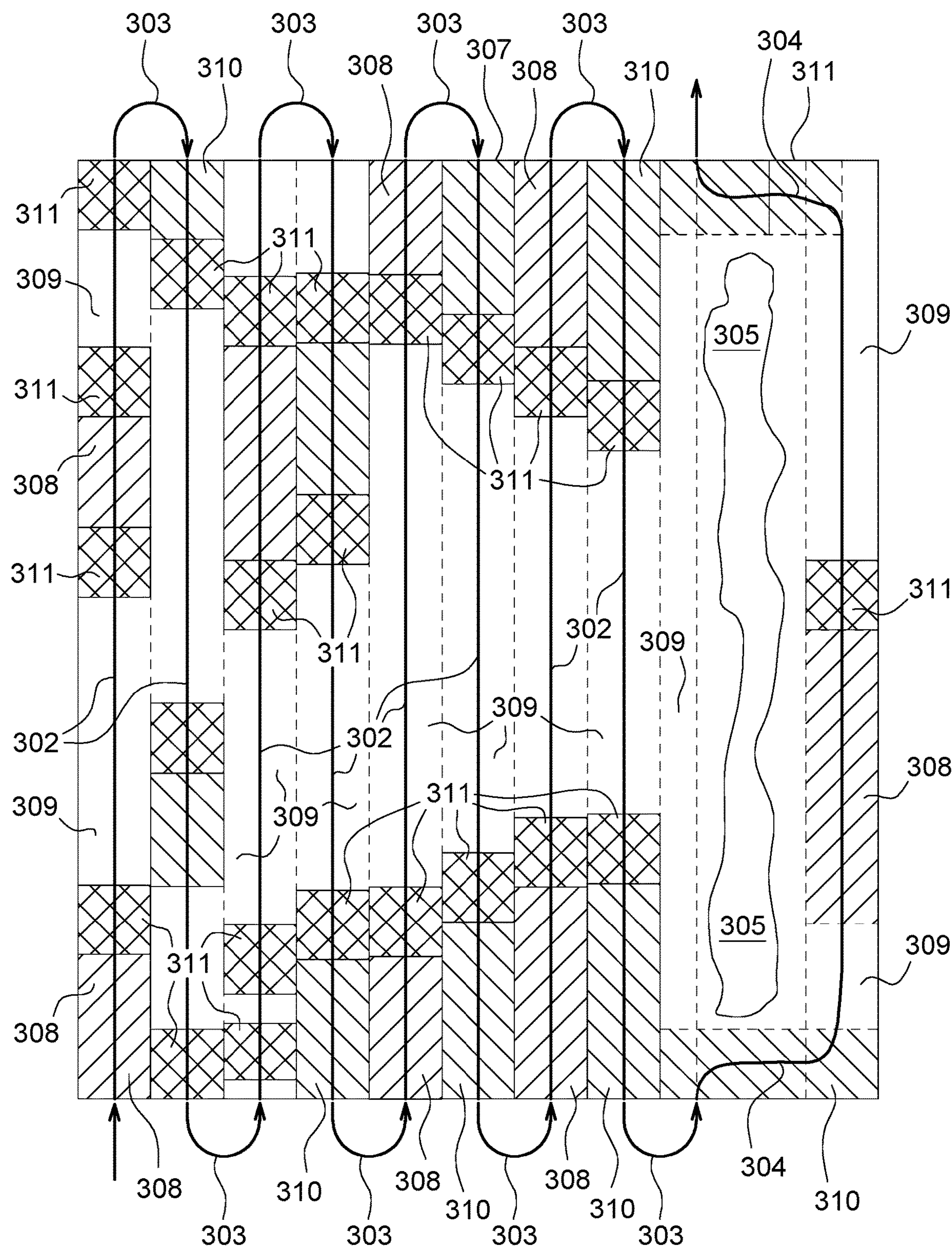
FIG. 3B is a plan view of a second illustrative map of surface roughness zones within a hypothetical field.

As illustrated in FIG. 1A in conjunction with FIG. 3A or FIG. 3B, the electronic data processor 18, the steering gain module 59, and the surface roughness management module 60 can be operated in accordance with various procedures that may be applied separately or cumulatively. Under a first procedure, the electronic data processor 18, the steering gain module 59, and the surface roughness management module 60 are configured to control an actuator of a steering system (42, 542) (e.g., via a steering controller 40) to adjust the estimated steering gain setting for corresponding zones with a surface roughness index ranges for transitions or changes between different zone limits or zone thresholds.

Under a second procedure, the electronic data processor 18, the steering gain module 59, and the surface roughness management module 60 are configured to control an actuator of a steering system (42, 542) (e.g., via a steering controller 40) to increase or increment the present steering gain setting for a corresponding primary zone (present zone) with a respective present surface roughness index range; where the increase or increment is with respect to a previous steering gain for a corresponding previous zone with a respective greater surface roughness index range than the primary surface index range; and where greater surface roughness means an upper limit of the present zone is lower than or equal to a lower limit of the previous zone.

Under a third procedure, the electronic data processor 18, the steering gain module 59, and the surface roughness management module 60 are configured to control an actuator of a steering system (42, 542) (e.g., via a steering controller 40) to decrease or decrement the present steering gain setting for a corresponding secondary zone (present zone) with a respective present surface roughness index range; where the decrease or decrement is with respect to a previous steering gain for a corresponding previous zone with a respective lesser surface roughness index range than the secondary surface index range; and where lesser surface roughness means an lower limit of the secondary zone (present zone) is greater than or equal to an upper limit of the previous zone.

The system 111 of FIG. 1B is similar to the system 11 of FIG. 1A, except the system 111 further comprises an imaging system 61, a visual surface roughness index estimator 32, a second location determining receiver 110, and a wireless communications device 147. As illustrated the imaging system 61 is coupled to one or more data ports 16 of the data processing system 14; the visual surface roughness index estimator 32 comprises a module or software instructions that are stored in the data storage device 24 for execution by the electronic data processor 18. Like reference numbers in FIG. 1A and FIG. 1B indicate like features or elements.

In one embodiment, the imaging system 61 is configured to collect image data of the field or work site in a forward field of view of the vehicle in one or more electromagnetic frequency bands or wavelengths, such as humanly visible light, infra-red radiation, ultra-violet radiation, or the like. For example, the imaging system 61 may comprise a stereo imaging system or stereo camera for collecting stereoscopic images or three-dimensional image clouds or three-dimensional image constellations of ground regions within the field of view (e.g., forward facing region or zone in front of the vehicle 82). In some configurations, the imaging system 61 or electronic data processor 18 can align (e.g., or stitch together) successive local images to assemble an aggregate view of an entire field or work area that is traversed or surveyed by the off-road vehicle equipped with the imaging system 61. For example, the imaging system 61 or electronic data processor 18 may assign or identify two or three dimensional reference points in successive local images to spatially align successive images to assemble an aggregate view of an entire field or work area.

Based on the collected three-dimensional image clouds or three-dimensional image constellations, a visual surface roughness index estimator 32 configured to estimate a visual surface roughness index for the collected image data within the field of view to establish a transition between different estimated steering gain setting zones. For example, the visual surface roughness estimator 32 may estimate or model the three-dimensional slope or compound slopes of zones or cells within the field of the work area, such as average, mean, mode or median cellular pitch angle, cellular roll angle and cellular yaw angle for each cell within a work area or field. In one configuration, the visual surface roughness index may be based on a visual estimation of the surface roughness index (p), determined in accordance with Equation 1.

In conjunction with the visual surface roughness index or transition regions 311 (in FIG. 3B) derived from the visual surface roughness index, the steering gain module 59 can be operated in accordance with various examples, which may be applied separately or cumulatively. Under a first example, prior to reaching a next transition region 311, a steering gain module 59 is configured to estimate a next steering gain setting for the vehicle (and/or its implement) consistent with alignment and/or overlap of the determined position, the estimated zones and the established transition region. Under a second example, at the entrance point or beginning of the next transition region 311, controlling an actuator of the steering system (42, 542) (e.g., via the steering controller 40) to increase or increment the gain setting for one or more primary corresponding zones with a surface roughness index range that is less than (or equal to) a limit (e.g., previous lower limit of surface roughness p) of a previous zone threshold that the vehicle, or its implement, is exiting. Under a third example, at the entrance point or beginning of the next transition region 311, controlling an actuator of the steering system (42, 542) (e.g., via the steering controller) to decrease or decrement the steering gain setting for one or more secondary corresponding zones with a surface roughness index range that is greater than (or equal to) a limit (e.g., previous upper limit) of the previous zone threshold to transition between the different steering gain settings that the vehicle, or its implement is exiting.

The second location-determining receiver 110 is the same or similar to the location-determining receiver 10, which may be referred to as the first location determining receiver. However, the first location-determining receiver may be mounted on or in the vehicle 82, or its implement (83, 500). If both a first location-determining receiver 10 and second location-determining receiver 110 are present, the second location-determining receiver is typically mounted on or in the implement (83, 500) and the first location-determining receiver is mounted on or in the vehicle 82. The wireless communications device 147 is the same or similar to the wireless communications device 47. For example, the wireless communications device 147 is coupled to the second location-determining receiver 110 to provide correction data to it.

Figure 2A:
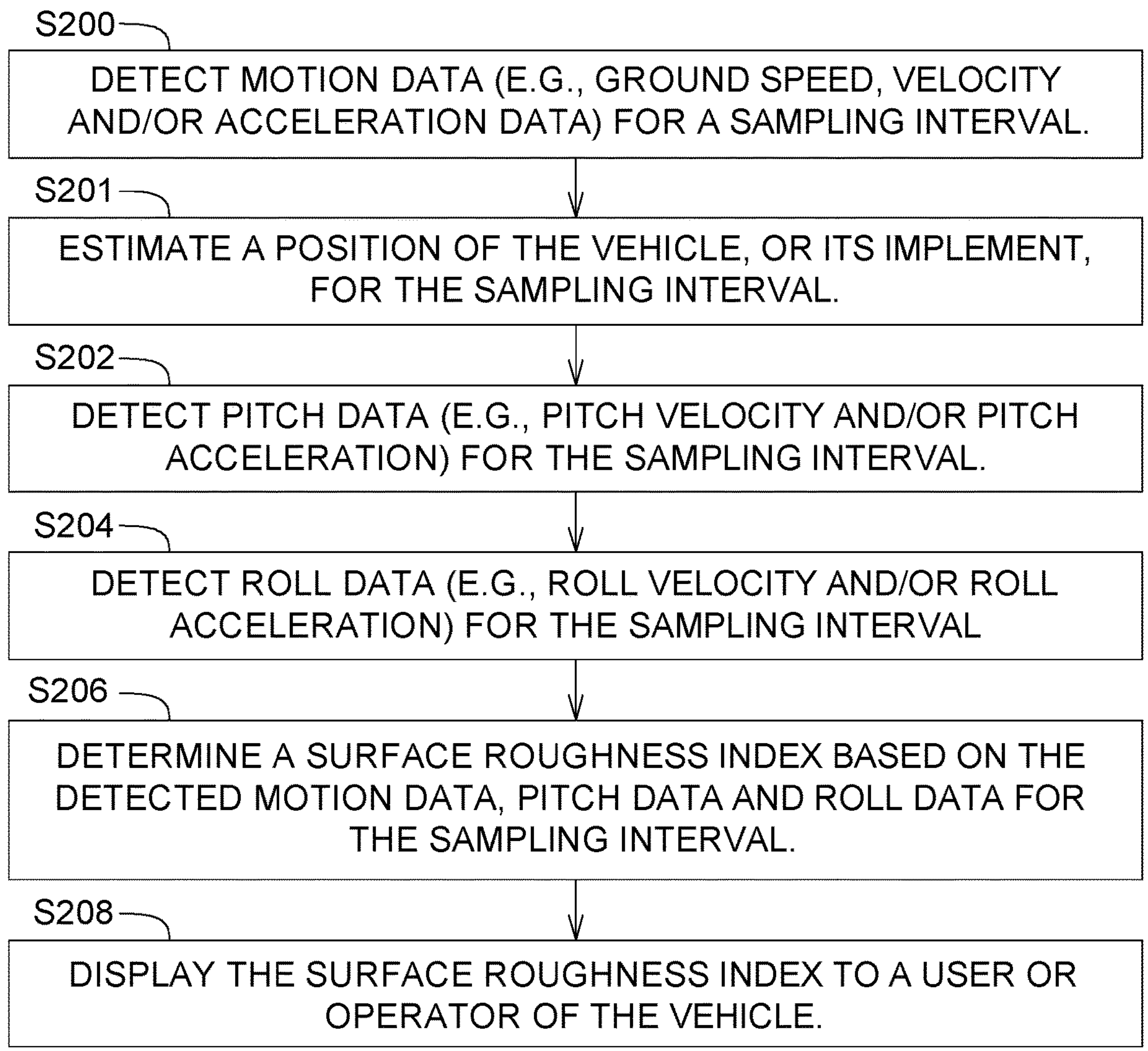
FIG. 2A is a flow chart of a first embodiment of a method for estimating surface roughness of ground for an off-road vehicle to control steering of the off-road vehicle, its implement, or both.

FIG. 2A is a flow chart of a first embodiment of a method for estimating surface roughness of ground for an off-road vehicle to control steering of the vehicle, its implement, or both. The method of FIG. 2 begins in step S200.

In step S200, a motion sensor, such as a location-determining receiver 10, detects motion data of an off-road vehicle (e.g., 82 in FIG. 4) traversing a field or work site (e.g., as illustrated in FIG. 3A or FIG. 3B, or otherwise) during a sampling interval or multiple sampling intervals. For example, the motion data comprises at least ground speed of the off-road vehicle.

In an alternate embodiment, the motion data may comprise any of the following measured or observed at the vehicle, the implement or both: ground speed, velocity, acceleration data for one or more sampling intervals In one embodiment, the motion sensor may comprise an odometer, a speedometer, a dead-reckoning sensor, an accelerometer 54, an inertial sensor module 56, a three-axis accelerometer assembly, a gyroscope 55, an inertial measurement unit (IMU) (53, 153), a radar system, a LIDAR system (e.g., light/laser detection and ranging), a satellite navigation receiver, a location-determining receiver (10, 110), a satellite navigation receiver with a wireless device for receiving correction data (e.g., differential correction data). A radar system may comprise a transmitter that transmits an encoded signal (e.g., pulse, pseudo-random noise code, or continuous waveform) toward an object and a receiver (e.g., doppler receiver) that receives a reflection of the coded signal from the object to determine a range, bearing, and/or velocity of an object. A location-determining receiver (10, 110) refers to a satellite navigation receiver with or without differential correction, along with a wireless communications device (47, 147) that can provide position, location, motion or attitude data from one or more terrestrial transmitter beacons on land or satellite transmitters in orbit about the Earth.

In step S201, a location-determining receiver (10, 110) (e.g., satellite navigation receiver) estimates or provides a respective position of the vehicle (e.g., 82), its implement (e.g., 83), for the sampling interval.

In step S202, a pitch sensor 256 or inertial sensor module 56 detects pitch data of the off-road vehicle for the sampling interval to obtain a pitch acceleration. The pitch sensor 256 may comprise an accelerometer or IMU (53, 153) that is configured to measure the pitch angle or attitude of the vehicle, its implement. The pitch sensor 256 may be mounted on the vehicle to measure the pitch angle or attitude of the vehicle, whereas the pitch sensor 256 may be mounted on the implement or each row unit 66 to measure the pitch angle or attitude of the implement or row unit 66 of the implement.

Further, the pitch sensor 256 or inertial sensor module 56 may be coupled to an analog-to-digital (A/D) converter that converts analog pitch angle to digital signal. After the analog-to-digital converter digitizes the signal, the data processing system 14 may apply the electronic data processor 18 (and clock) to determine or derive the pitch angle velocity or pitch angle acceleration from the digital pitch angle. For example, the electronic data processor 18 may take the second derivative of the pitch angle with respect to time to determine the estimated pitch angle acceleration for one or more sampling intervals.

In step S204, a roll sensor 156 or inertial sensor module 56 detects roll data of the off-road vehicle for the sampling interval to obtain a roll acceleration. The roll sensor 156 may comprise an accelerometer or IMU (53, 153)) that is configured to measure the roll angle or attitude of the vehicle (e.g., 82), its implement (e.g., 83, or one or more row units 66). The roll sensor (e.g., 156) may be mounted on the vehicle, to measure the roll angle or attitude of the vehicle, whereas the roll sensor (e.g., 156) may be mounted on the implement or each row unit 66 to measure the roll angle or attitude of the implement or row unit 66 of the implement.

Further, the roll sensor 156 or inertial sensor module 56 may be coupled to a analog-to-digital (A/D) converter that converts analog roll angle to digital signal. After the analog-to-digital converter digitizes the signal, the data processing system 14 may apply the electronic data processor 18 (and clock) to determine or the roll angle velocity or roll angle acceleration from the digital roll angle. For example, the electronic data processor 18 may take the second derivative of the roll angle with respect to time to determine the estimated roll angle acceleration for one or more sampling intervals.

In step S206, an electronic data processor 18, the surface roughness estimator 57, or the surface roughness index estimator module 62 determines or estimates a surface roughness index for a cell or zone of the field or work area based on the detected motion data, pitch data and roll data for the sampling interval.

The surface roughness index (p) for a corresponding point, path segment (e.g., linear path segment), zone, cell, region, strip, portion or area of the field or work site may be determined in accordance with the following equation ("Equation 1"):

$$\rho = \frac{\mathrm{RMS}(A_{Pitch}) + \mathrm{RMS}(A_{Roll})}{S},$$

where RMS ($A_{pitch}$) is equal to root-mean-squared, angular pitch acceleration in meters per second squared (m/s$^2$); RMS ($A_{Roll}$) is equal to root-mean-squared, angular roll acceleration in meters per second squared (m/s$^2$), and S refers to speed in meters per second (m/s) of the vehicle or the implement in conjunction with a corresponding point, path segment (e.g., linear path segment), zone, cell, region, strip, portion or area of the field or work site in which samples (e.g., pitch or roll measurements) or observations were made.

RMS(APitch) can be determined by firstly squaring each observed angular pitch acceleration in a set of (raw) samples (e.g., collected during a sampling interval, such as for N raw samples: $A_{Pitch1}{}^2$+$A_{Pitch2}{}^2$+ . . . $A_{PitchN}{}^2$), by secondly determining a mean of the set of squared samples (e.g., divided by the total number N of samples), and by thirdly taking a square root of the determined mean in accordance with the following equation ("Equation 2"):

$$\mathrm{RMS}(APitch) = \sqrt{(A_{Pitch1}^2 + A_{Pitch2}^2 + \ldots\ A_{PitchN}^2)/N}\ ,$$

where $A_{Pitch1}{}^2$ is the square of the first sample of observed angular pitch acceleration (in meters per second squared); $A_{Pitch2}{}^2$ is the square of the second sample of observed angular pitch acceleration (in meters per second squared); and $A_{PitchN}{}^2$ is the square of the Nth sample or last sample among N total samples.

RMS(ARoll) can be determined by firstly squaring each observed angular roll acceleration in a set of (raw) samples (e.g., collected during a sampling interval, such as for N raw samples: $A_{Roll1}^2+A_{Roll2}^2+\ldots A_{RollN}^2$), by secondly determining a mean of the set of squared samples (e.g., divided by the total number N of samples), and by thirdly taking a square root of the determined mean in accordance with the following equation ("Equation 3"):

$$\mathrm{RMS}(ARoll) = \sqrt{(A_{Roll1}^2 + A_{Roll2}^2 + \ldots A_{RollN}^2)/N},$$

where $A_{Roll1}^2$ is the square of the first sample of observed angular roll acceleration (in meters per second squared); $A_{Roll2}^2$ is the square of the second sample (in meters per second squared), and $A_{RollN}^2$ is the Nth sample or last sample among N total samples.

Throughout this disclosure, a zone for a corresponding surface roughness index (range) may be defined by various attributes or characteristics as set forth in the following examples, which may be applied separately or cumulatively. In a first example, each zone (of corresponding surface roughness index) may comprise a cell of uniform size or uniform dimensions through the field or work site, such as a zone or region with a polygonal boundary (e.g., triangular, rectangular, hexagonal or pentagonal), or a region with another geometric shape. In a second example, each zone (of corresponding surface roughness index) comprises a substantially rectangular strip associated with the vehicle width or swath, or the implement width or swath, such as a physical lateral dimension of the implement, the vehicle or its wheelbase. In third example, each zone a zone comprises a region with a curved contour or any other shape, where the surface area roughness for a corresponding zone is associated with: (a) a uniform surface roughness index mean, average, mode, or median, or (b) a defined range of surface roughness index, where each range has a lower limit and an upper limit.

In step S208, the display 25 or user interface 22 displays or provides a representation of the surface roughness index by respective position (e.g., two or three dimensional coordinates) to a user or operator of the vehicle. Further, the electronic data processor 18 may collect and store regularly the surface roughness index by respective position in a data storage device 24 to create a data map 301 (e.g., in FIG. 3A and FIG. 3B) of surface roughness index versus respective positions. For manned vehicles, the graphical display 25 can be presented on a display 25 within the vehicle or, for unmanned vehicles, remotely from the vehicle via a wireless link.

In one configuration, the user interface 22 or display 25 may display a numerical indication, ranking or other visual indicator of one or more ranges of surface roughness index that is determined or provided by the data processor 18, the surface roughness estimator 57, or the surface roughness index estimator 62. For example, in accordance with the above equation, the surface roughness index may be scaled or normalized to have a value of surface roughness index: (a) between 0 to 10, where 10 indicates a maximum surface roughness index and 0 indicates the minimum surface roughness index; or (b) between 0 to 10, where 10 indicates a maximum surface roughness index and 0 indicates the minimum surface roughness index.

The surface roughness index may be organized or classified in accordance with various examples, which may be applied separately or cumulatively. Under a first example, the above Equation 1 may provide a surface roughness index (p) that may be divided into two ranges, such as a first range and a second range. Under a second example, the above Equation 1 may provide a surface roughness index (p) that may be divided into the following two ranges: (1) normal and elevated; (2) smooth and rough; (3) acceptable and unacceptable. Under a third example, the typical range of surface roughness index (p) may range between two ranges that are determined by the mode or median value of estimated surface roughness in accordance with the above Equation 1. In a fourth example, the typical range of surface roughness index (p) may range between two ranges that are determined as follows: (a) smooth, conditioned for planting, which is defined as surface roughness index from approximately 1 to 15; (b) rough, primary tillage (ripped ground), which is defined a surface roughness index (p) from approximately 16-35, where approximately means a tolerance of plus or minus ten percent.

Figure 2B:
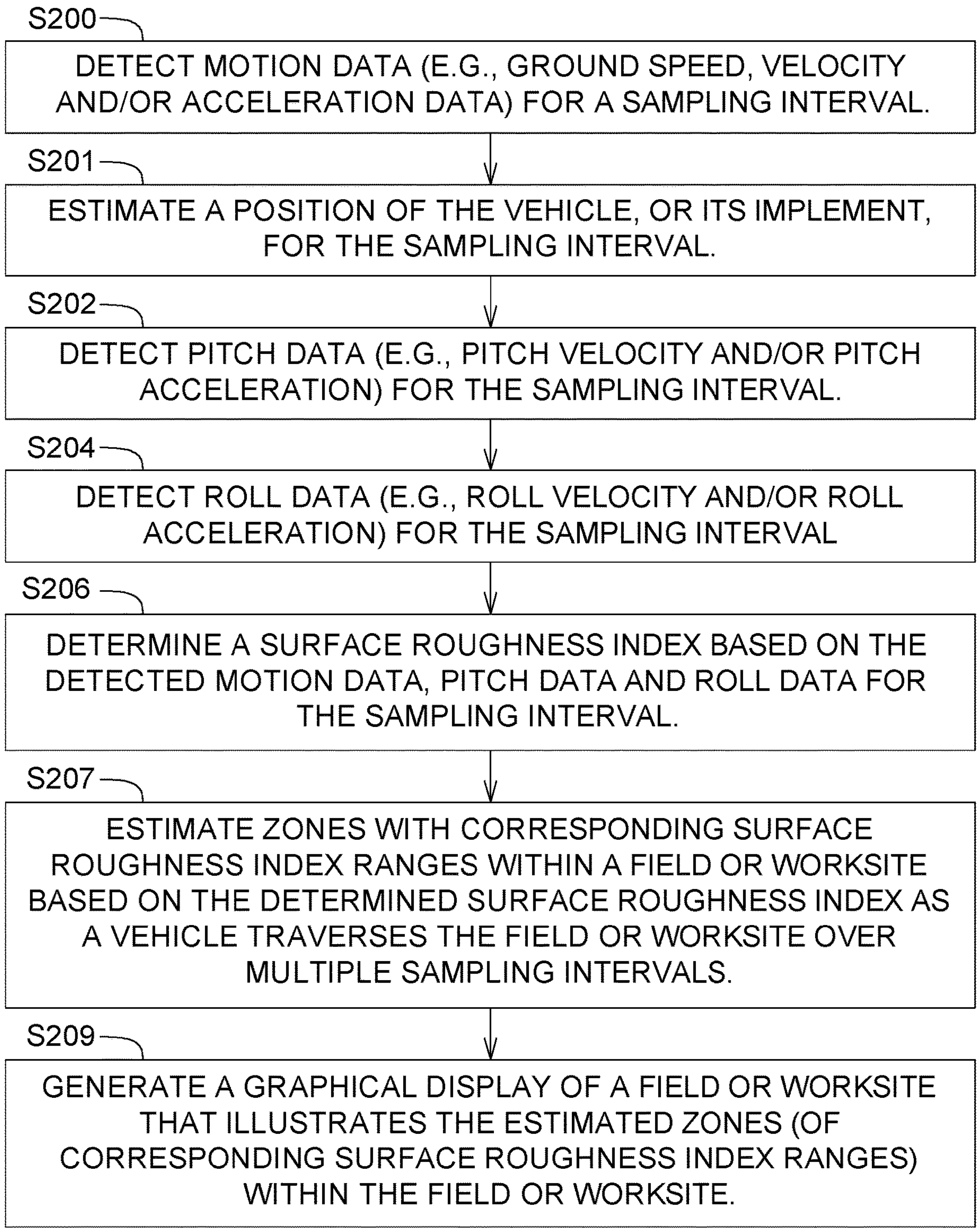
FIG. 2B is a flow chart of a second embodiment of a method for estimating surface roughness of ground for an off-road vehicle to control steering of the off-road vehicle, its implement, or both.

FIG. 2B is a flow chart of a second embodiment of a method for estimating surface roughness of ground for an off-road vehicle to control steering of the vehicle, its implement, or both. Like reference numbers in FIG. 2A and FIG. 2B indicate like steps or procedures.

In step S207, the electronic data processor 18, the surface roughness estimator 57, or surface roughness index estimator 62 is configured to estimate zones (e.g., cells) with corresponding surface roughness index ranges within a field or work site based on the determined surface roughness index versus positions (e.g., two or three dimensional coordinates) as a vehicle (e.g., 82) traverses or traversed the field or work site over multiple sampling intervals. For example, the electronic data processor 18, the surface roughness estimator 57, or surface roughness index estimator 62 collects a series of positions versus determined surface roughness index and classifies, ranks, clusters, groups or processes like surface roughness index within corresponding sets of non-overlapping ranges to create respective zones (e.g., to form a data map 301 in FIG. 3A and FIG. 3B). In one configuration as illustrated in hypothetical example of FIG. 3A, the non-overlapping ranges may comprise one or more of the following: a first zone 308 associated with a first range of surface roughness index values bounded by a first lower limit and a first upper limit of surface roughness index; a second zone 309 associated with a second range of surface roughness index values bounded by a second lower limit and a second upper limit of surface roughness index, and a third zone 310 associated with a third range of surface roughness index values bounded by a third lower limit and a third upper limit of surface roughness index.

The method of FIG. 2B may be deployed iteratively as survey of a corresponding field or work site each year or growing season, or as frequently as required to update surface roughness index information as recommended by civil engineering consultants, agronomists, soil experts or others. FIG. 3A provides one illustrative example of data maps 301 of zones of the corresponding surface index values that can be stored and retrieved on a field or work site for growing season or from the last growing season for application to a next growing season.

The data maps 301 or underlying data for surface index values versus zones may be stored on a data storage device 24 of the data processing system 14 or uploaded to a central server or a cloud computing service for retrieval by a different data processing system 14 on another subsequent vehicle or subsequent implement for performing a subsequent agronomic task in a growing season.

In step S209, the electronic data processor 18, surface roughness index estimator 62, or surface roughness estimator 57 can generate a graphical display 25 that illustrates the estimated zones of corresponding surface roughness or index ranges within the field or work site.

Figure 2C:
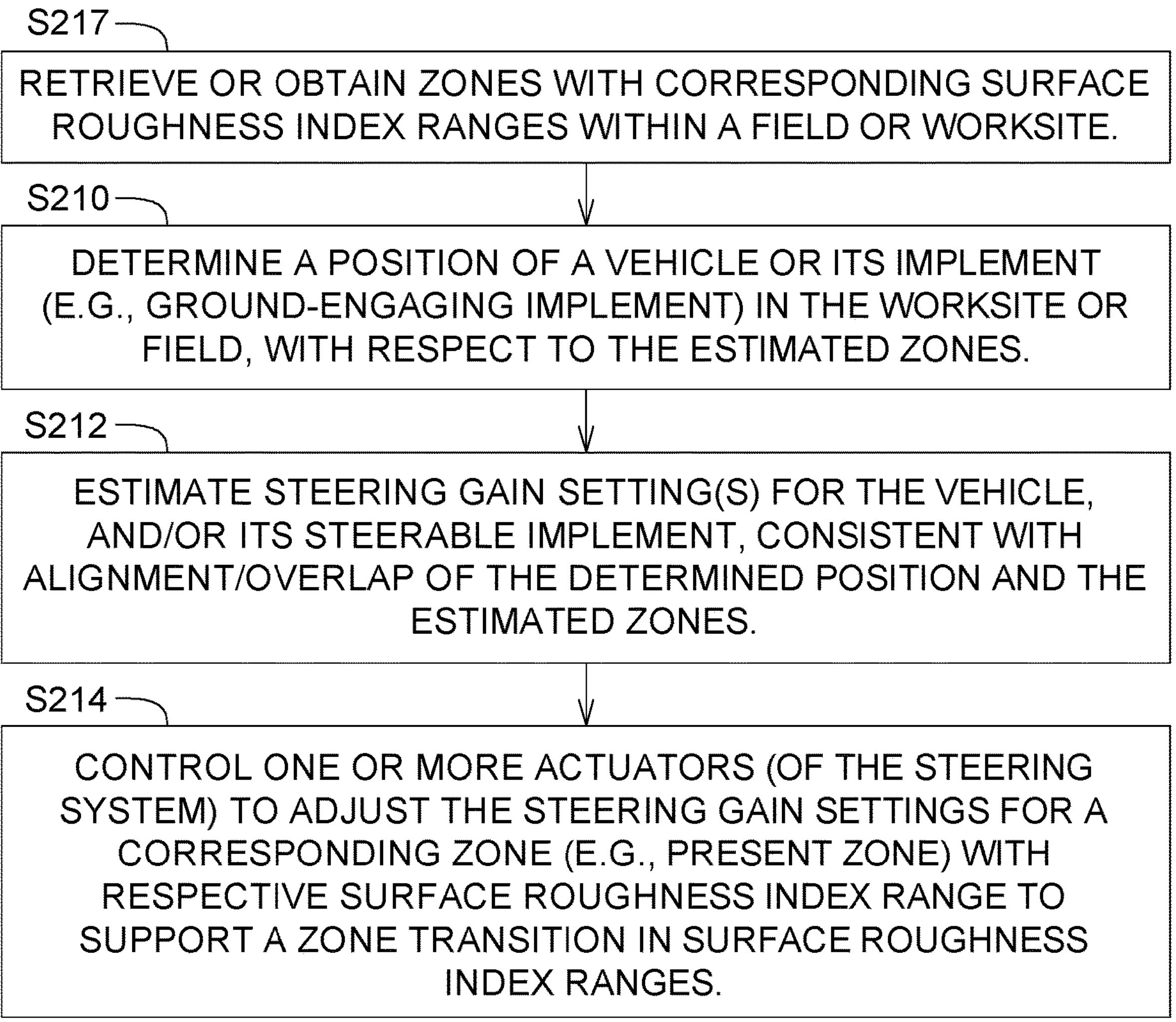
FIG. 2C is a flow chart of a third embodiment of a method for estimating surface roughness of ground for an off-road vehicle to control steering of the off-road vehicle, its implement, or both.

FIG. 2C is a flow chart of a third embodiment of a method for estimating surface roughness of a ground for an off-road vehicle to control steering of the off-road vehicle, its implement, or both.

In step S217, the electronic data processor 18 retrieves or obtain zones with corresponding surface roughness index ranges with a field or work site. For example, the electronic data processor 18 retrieves or obtains stored zones (e.g., in a data storage device 24) with corresponding surface roughness index ranges with a field or work site. Further, the stored zones with corresponding surface roughness index ranges may arise from previous step S207 of FIG. 2B, based on determined surface roughness index for a vehicle that traversed the field or work site.

In the method of FIG. 2A or FIG. 2B in preparation for step S217 of FIG. 2C, the data maps 301 or underlying data for surface index values versus zones may be stored on a data storage device 24 of the data processing system 14 or uploaded to a central server or a cloud computing service (e.g., with data storage devices) for retrieval by a different data processing system 14 on another subsequent vehicle or subsequent implement for performing a subsequent agronomic task in a growing season. For instance, an earlier vehicle (e.g., survey vehicle or reconnaissance vehicle, such as vehicle 82 without implement 83) may provide a survey service for collecting that data maps 301 of surface roughness index zones (e.g., incidental to the method of FIG. 2B), while a subsequent vehicle and/or implement (e.g., a combination of vehicle 82 with implement 83) may perform a tillage or planting operation (e.g., in FIG. 2C), or spraying operation (e.g., sprayer implement, or boom with nozzles required); where the earlier vehicle electronics and subsequent vehicle electronics (e.g., systems 11, 111 or data processing systems (e.g., 14)) can exchange or share data (e.g., estimated in step S207 of FIG. 2B for retrieval in step S217 of FIG. 2C) via the data storage device 24, the central service or cloud, with appropriate consent for processing, exchanging or sharing the data.

In an alternate embodiment, step S217 of FIG. 2C may be replaced by step S207 of FIG. 2B.

In step S210, the location determining receiver (10, 110) determines or estimates a position (e.g., in two or three dimensional coordinates) of the vehicle, or its implement in the work site or field with respect to the estimated zones (e.g., 308, 309, 310 in FIG. 3A) of different corresponding surface roughness index ranges.

In step S212, an electronic data processor 18, a steering gain module 59 (e.g., setting module estimates), or a surface roughness management module 60 estimates or generates and/or sends a gain setting 41 for the vehicle, and/or its steering implement, consistent with alignment and/or overlap of the determined position of the implement and the estimated zones (e.g., 308, 309, 310 in FIG. 3A). For example, in step S212, an electronic data processor 18, a steering gain module 59 (e.g., setting module estimates), or a surface roughness management module 60 estimates or generates and/or sends a gain setting 41 to the steering controller 40 (e.g., via the vehicle data bus 12), consistent with alignment and/or overlap of the determined position of the implement and the estimated zones (e.g., 308, 309, 310 in FIG. 3A.

In one embodiment, the electronic data processor 18, a steering gain module 59 (e.g., setting module estimates), or a surface roughness management module 60 may estimate a steering gain setting (and dynamically adjust in real time) for the vehicle, and/or its steerable implement 500 (e.g., the entire implement with actuator controlled steerable wheels, steerable tracks or steerable ground-engaging members) consistent with alignment and/or overlap of the determined position of the implement 500 and the estimated zones.

In step S214, the electronic data processor 18, the steering gain module 59, and/or the surface roughness management module 60 controls the steering system 42, the steering actuator 509, or both such as one or more actuators within the vehicle steering system 42 or the implement steering system (e.g., 542 in FIG. 5) or both, to adjust (e.g., increase or decrease) the steering gain setting for a corresponding zone (e.g., present zone) with a respective surface roughness index range to support a zone transition or changes in surface roughness index ranges between spatially adjacent different estimated zones, such as a transition between a previous zone and present zone (of respective different surface roughness index ranges) that share a common boundary. Each zone has corresponding limits (e.g., a lower limit and an upper limit that collectively define the zone) or zone thresholds for its respective surface roughness index range. In other words, the steering gain module 59, and/or the surface roughness management module 60 controls the steering system 42 or the implement steering system 542, such as one or more actuators within the steering system 42, the implement steering system (542 in FIG. 5), or both to adjust (e.g., increase or decrease) the steering gain setting for a corresponding zone with a respective surface roughness index range to support a transition or changes in surface roughness index ranges between spatially adjacent different limits or different zone thresholds.

Step S214 may be executed in accordance with various techniques that may be applied separately or cumulatively. Under a first technique, the electronic data processor 18, the steering gain module 59, and/or surface roughness management module 60 sends control messages or control data (e.g., gain settings) to control a steering system (42, 542)(e.g., of the vehicle and/or its implement) to adjust (e.g., increase, increment, decrease, or decrement) the present gain setting (e.g., vehicle gain setting, implement gain setting, or both) for corresponding presently applicable zones (e.g., one or more upcoming zones) with respective surface roughness index ranges that: (a) are outside the limits (of corresponding surface roughness index ranges) for presently applicable zones consistent with the present determined position of the vehicle and the estimated zones, and/or (b) are different than the limits (of corresponding surface roughness index ranges) of previously applicable zones consistent with the previously determined position of the vehicle and the estimated zones. Present gain settings or present steering gains are applicable to respective present zones or presently applicable zones (of corresponding surface roughness index ranges), where presently applicable zones may comprise one or more zones that are presently occupied by the vehicle, and/or its implement, and/or upcoming zones. Previous gain settings or previous steering gains are applicable to respective previous zones or previously applicable zones (of corresponding surface roughness index ranges), where previously applicable zones may comprise one or more zones that were previously occupied by the vehicle, and/or its implement, such as previously applicable zones that intercept a path plan of the vehicle and/or its implement immediately prior to reaching the present zone.

Under a second technique, the electronic data processor 18, the steering gain module 59, and/or surface roughness management module 60 sends control messages or control data (e.g., gain settings, vehicle gain settings, or implement gain settings) to control a steering system (42, 542) (e.g., of the vehicle and/or its implement) to increase or increment the present gain setting for a corresponding zone transition (e.g., of vehicle position and/or implement position) from a greater surface area roughness zone (e.g., previous zone with a higher average or mean p) to a lesser surface area roughness zone (e.g., present zone with a lower average or mean p), where the lesser surface area zone (e.g., present zone) has a lesser surface area roughness index range (e.g., lower average or mean p) than a greater surface area roughness index range (e.g., higher average or mean p) of the greater surface area roughness zone (e.g., previous zone). The previous zone and the present zone may share a common spatial boundary; the vehicle or its implement may follow or trace a path plan that firstly intercepts or falls within the previous zone and secondly intercepts or falls within the present zone.

Under a third technique, the electronic data processor 18, the steering gain module 59, and/or surface roughness management module 60 sends control messages or control data (e.g., gain settings, vehicle gain settings, or implement gain settings) to control a steering system (42, 542) (e.g., of the vehicle and/or its implement) to decrease or decrement the present gain setting for a corresponding zone transition (e.g., of vehicle position and/or implement position) from a lesser surface area roughness zone (e.g., previous zone with a lower average or mean p) to a greater surface area roughness zone (e.g., present zone with a higher average or mean p), where the lesser surface area zone (e.g., previous zone) has a lesser surface area roughness index range (e.g., lower average or mean p) than a greater surface area roughness index range (e.g., higher average or mean p) of the greater surface area roughness zone (e.g., present zone). The previous zone and the present zone may share a common spatial boundary; the vehicle or its implement may follow or trace a path plan that firstly intercepts or falls within the previous zone and secondly intercepts or falls within the present zone.

Under a fourth technique, the electronic data processor 18, the steering gain module 59, and/or surface roughness management module 60 sends control messages or control data (e.g., gain settings) to control a steering system (42, 542) (e.g., of the vehicle and/or its implement) to increase or increment the gain setting for corresponding next zone (e.g., upcoming zones) with respective surface roughness index ranges that: (a) are outside the limits (of a respective present surface roughness range) of a present zone consistent with the present determined position of the vehicle and the estimated boundaries of present and next zones, and (b) represent a zone transition (e.g., of vehicle position and/or implement position) from a greater surface roughness in a respective present zone to a lower surface roughness in a respective next zone, where the lesser surface area zone (e.g., next zone) has a lesser surface area roughness index range (e.g., lower average or mean p) than a greater surface area roughness index range (e.g., higher average or mean p) of the greater surface area roughness zone (e.g., present zone).

Under a fifth technique, the electronic data processor 18, the steering gain module 59, and/or surface roughness management module 60 sends control messages or control data (e.g., gain settings) to control a steering system (42, 542) (e.g., of the vehicle and/or its implement) to decrease or decrement the gain setting for corresponding next zone (e.g., upcoming zones) with respective surface roughness index ranges that: (a) are outside the limits (of a respective present surface roughness range) of a present zone consistent with the present determined position of the vehicle and the estimated boundaries of present and next zones, and (b) represent a zone transition (e.g., of vehicle position and/or implement position) from a lesser surface roughness in a respective present zone to a greater surface roughness in a respective next zone, where the lesser surface area zone (e.g., present zone) has a lesser surface area roughness index range (e.g., lower average or mean p) than a greater surface area roughness index range (e.g., higher average or mean p) of the greater surface area roughness zone (e.g., next zone).

Figure 2D:
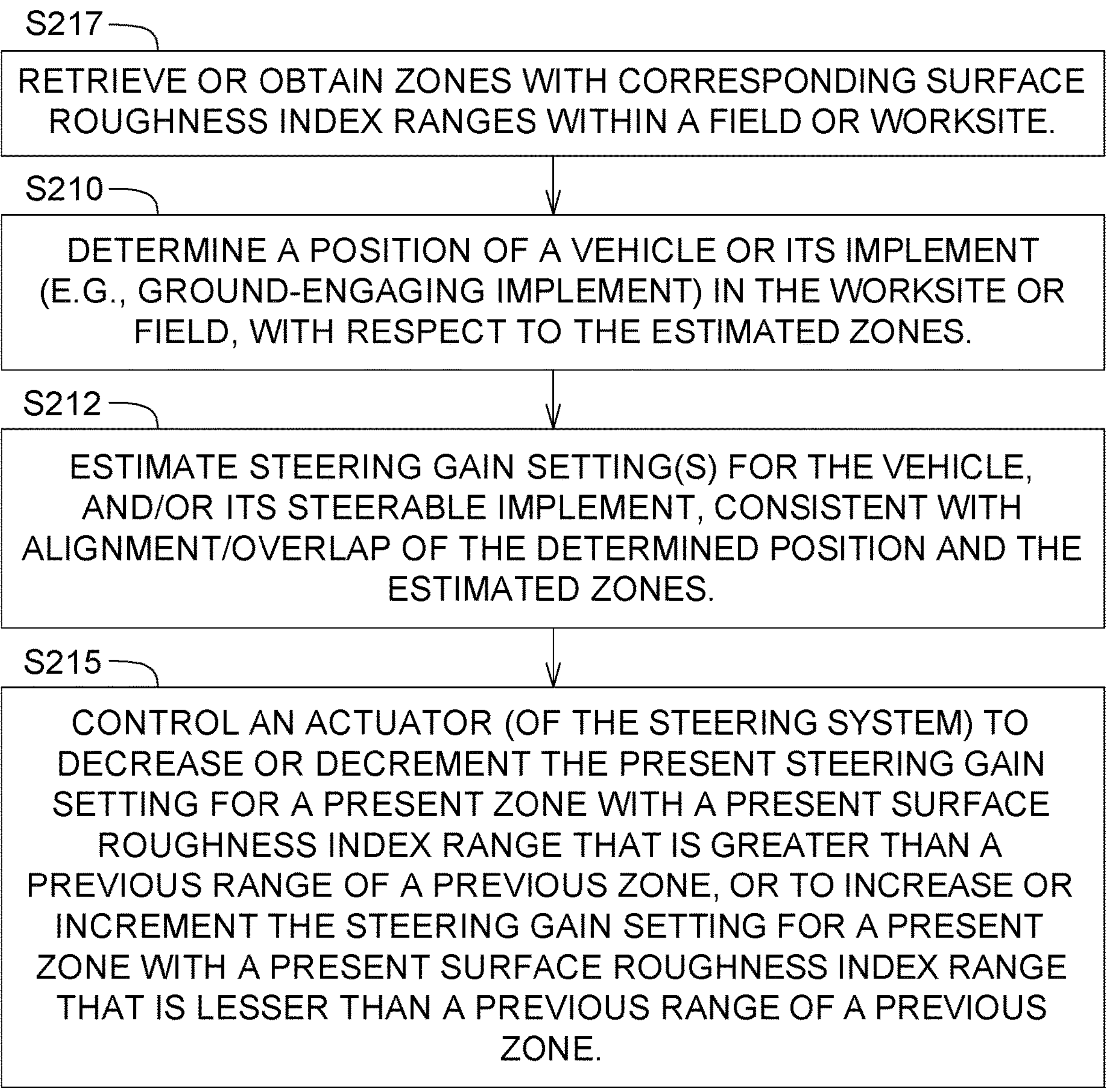
FIG. 2D is a flow chart of a fourth embodiment of a method for estimating surface roughness of ground for an off-road vehicle to control steering of the off-road vehicle, its implement, or both.

FIG. 2D is a flow chart of a fourth embodiment of a method for estimating surface roughness of a ground for an off-road vehicle to control an implement, its implement, or both. Like reference numbers in FIG. 2C and FIG. 2D indicate like steps or procedures.

In step S215, an electronic data processor 18, the steering gain module 59, and/or the surface roughness management module 60 generates and sends a control message or control data (e.g., gain setting) to control the steering system (42, 542) (e.g., one or more actuators of the steering system 42 via the steering controller 40): (a) to decrease or decrement the present steering gain setting for a present zone with a present surface roughness index range that is greater than a previous zone or exited zone with previous surface roughness index range, where the vehicle and/its implement has moved, transitioned or exited from the previous zone into the present zone; where present zone may be referred to a primary zone associated with a primary lower limit and primary upper limit; where the previous zone may be associated with a previous lower limit and previous upper limit; and where primary lower limit is equal to or greater than the previous upper limit; and (b) to increase or increment the present steering gain setting for a present zone with a present surface roughness index range that is lesser than a previous zone or exited zone with previous surface roughness index range, where the vehicle and/its implement has moved, transitioned or exited from the previous zone into the present zone; where present zone may be referred to a secondary zone associated with a secondary lower limit and secondary upper limit; where the previous zone may be associated with a previous lower limit and previous upper limit; and where secondary upper limit is equal to or less than the previous lower limit.

The electronic data processor 18, the steering gain module 59, and/or the surface roughness management module 60 determines whether to decrease or increase the steering gain setting based upon the present position of the vehicle relative to the zone; that is whether the present zone is occupied by the vehicle and/or its implement, or whether a next zone is to be occupied by the vehicle and/or its implement. As the vehicle and/or its implement approaches, reaches, intercepts, or passes a boundary between different zones with different surface roughness index ranges, the electronic data processor 18, the steering gain module 59, and/or the surface roughness management module 60 determines whether to decrease or increase the steering gain setting in a transition region that may overlap with the boundary, the present zone (exiting zone) and the next zone (entering zone).

Step S215 may further comprise one or more of the following aspects related to the boundaries between adjacent zones:

Under a first aspect of step S215, if the electronic data processor 18, the guidance module 26 and/or the location-determining receiver (10, 110) determines that a position of the vehicle and/or its implement (e.g., observed path plan) coincides with, crosses or reaches a boundary between a present zone and a next zone (e.g., upcoming zone) from a present zone, the electronic data processor 18, the steering gain module 59, and/or the surface roughness management module 60 is configured (e.g., triggered) to decrease or decrement the steering gain setting (e.g., at the steering controller 40) for corresponding next zone with a next surface roughness index range that are greater than a present surface index range of a present zone. Conversely, under a second aspect of step S215, if the electronic data processor 18, the guidance module 26 and/or the location-determining receiver (10, 110) determines that a position of the vehicle and/or its implement (e.g., observed path plan) coincides with, crosses or reaches a boundary between a present zone and a next zone (e.g., upcoming zone) from a present zone, the electronic data processor 18, the steering gain module 59, and/or the surface roughness management module 60 is configured (e.g., triggered) to increase or increment the steering gain setting (e.g., at the steering controller 40) for corresponding next zone with a next surface roughness index range that are lesser than a present surface index range of a present zone.

In an alternate embodiment, step S217 of FIG. 2D may be replaced by step S207 of FIG. 2B.

FIG. 2E is a flow chart of a fifth embodiment of a method for estimating surface roughness of a ground for an off-road vehicle to control steering of a vehicle, its implement, or both. Like reference numbers in FIG. 2C and FIG. 2D indicate like steps or procedures. The method of FIG. 2E is similar to the method of FIG. 2C, except the method of FIG. 2E further comprises image data enhancement of surface field roughness estimations. Like reference numbers in FIG. 2A through FIG. 2E, inclusive, indicate like steps, procedures or features.

In step S211, an imaging device (e.g., stereo camera) collects image data of the field or work site in a forward field of view of the vehicle. The forward field of view may include one or more cells, zones or regions of the field or work site, along with one or more reference points (e.g., temporary two or three dimensional reference markers that can be removed or not displayed to an end user) that can augment or supplement the collected image data to facilitate aligning successive images to create (e.g., stitch together) an aggregate image.

In step S213, a data processor 18, surface roughness estimator 57, or visual surface roughness index estimator 32 estimates a visual surface roughness index for the collected image data within the field of view to establish a transition between different estimated steering gain zones. For example, a data processor 18, surface roughness estimator 57, or visual surface roughness index estimator 32 estimates a visual surface roughness index for the collected image data within one or more regions, zones or cells within a field of view to establish a transition (e.g., transition regions 311) between different estimated steering gain zones (e.g., zones 308, 309, 310).

In step S216, prior to reaching a next transition region 311, the data processor 18, a steering gain module 59, and/or surface roughness management module 60 estimates a next steering gain setting for the vehicle and/or implement consistent with alignment and/or overlap of the determined position, the estimated zones (e.g., 308, 309, 310) and the established transition region(s) 311. For example, prior to reaching a next transition region 311 during a look-ahead preparation period, the data processor 18, a steering gain module 59, and/or surface roughness management module 60 estimates a steering gain setting for the vehicle and/or implement consistent with alignment and/or overlap of the determined position, the estimated zones (e.g., 308, 309, 310) and the established transition region(s) 311.

In step S218, at the entrance point or beginning of the next transition region, a data processor 18, the steering gain module 59, and/or surface roughness management module 60 controls, directly or indirectly, an actuator of the steering system (42, 542) (e.g., via the steering controller 40) to increase or increment the next steering gain setting for one or more (present) primary corresponding zones (e.g., 308, 309, 310) with a surface roughness index range or ranges that are lesser than a limit (e.g., an lower limit) of a previous zone threshold (e.g., secondary zone threshold) that the vehicle, or its implement, is exiting. Alternately, or in any later sampling period, in step S218 at the entrance point or beginning of the next transition region, data processor 18, the steering gain module 59, and/or surface roughness management module 60 controls, directly or indirectly, an actuator of the steering system (42, 542) (e.g., via the steering controller 40) to decrease or decrement the next steering gain setting for one or more secondary corresponding zones (e.g., 308, 309, 310) with a surface roughness index range or ranges that are greater than a limit (e.g., an upper limit) of the previous zone threshold (e.g., primary zone threshold) to transition between the different steering gain settings that the vehicle, or its implement, is exiting.

FIG. 3A is a plan view of a first illustrative data map 301 of surface roughness zones within a hypothetical field. FIG. 3A shows an illustrative path plan of a field in which the vehicle (e.g., 82) or the vehicle and its implement (e.g., 83) travels a circuitous path in generally parallel rows 302 (e.g., substantially linear segments) such that, in the aggregate after completing many rows, columns or passes, the swath or width of the implement covers a substantially an entire area within a field or work site. The field has boundaries, such as side edges 306 and end boundaries 307. As illustrated, at the end of each end boundary 307, the vehicle makes an end turn 303 of approximately one-hundred and eighty degrees to return to the next adjacent row. There may be no overlap of the swath of the vehicle or implement between adjacent rows 302, or there may be a slight overlap between adjacent rows 302 that assure that there is no or minimal gap in coverage where the implement is a sprayer, a planter or another device.

On the right side of the field, there is a keep-out area 305 (e.g., hazard), such as a waterway, wetland, swamp or drainage area, or channel that cannot be traversed by the vehicle or implement. Accordingly, the path plan and its path segments 304 are directed around the keep-out area 305.

In one configuration, the non-overlapping ranges may comprise one or more of the following: a first zone 308 associated with a first range of surface roughness index values bounded by a first lower limit and a first upper limit of surface roughness index; a second zone 309 associated with a second range of surface roughness index values bounded by a second lower limit and a second upper limit of surface roughness index, and a third zone 310 associated with a third range of surface roughness index values bounded by a third lower limit and a third upper limit of surface roughness index. In practice, it is understood that the non-overlapping ranges or zones (308, 309, 310) are not limited to any particular geometric shape; is some configurations the resolution of the non-overlapping regions or zones may comprise strips (e.g., of defined lengths in the direct of travel of the vehicle or implement) that are associated with one or more row units 66. The data map 301 of FIG. 3A may be stored in the memory of the data storage device 24 of the data processing system 14 or retrieved or accessed from a data storage device associated with a central server or the cloud via a wireless communications link or wireless communications network.

In one embodiment, the data processor 18 or the steering gain module 59 may estimate a corresponding steering gain setting for each zone (308, 309, 310); and adjust the steering gain (e.g., target steering gain) to coincide with the zone in which the vehicle or its implement is currently traversing such that guidance and tracking of the observed vehicle path is substantially aligned with the target vehicle path (e.g., path plan) with minimal lateral tracking error and reduced deviation. For example, if the target vehicle path comprises a linear path segment or series of parallel linear path segments that are aligned in adjacent rows, the tracking with minimal lateral tracking error tends to reduce fuel consumption of the vehicle and over-application of crop inputs, such as fertilizer, nutrients, nitrogen, potassium, phosphorus, calcium, minerals, pesticides, herbicides, fungicides, seeds and/or rootstock.

As illustrated in FIG. 3A and FIG. 3B, the first zone 308 is illustrated by cross-hatched regions or first strips along the path plan (e.g., for rows 302 and end turns 303) of the vehicle and its implement track; the second zone 309 is illustrated by regions or second strips without any cross-hatch fill pattern; and the third zone 310 is illustrated by cross-hatched regions or third strips along the path plan of the vehicle. For clarity the cross hatched regions of the first zone 308 are oriented in a different direction that the cross-hatched regions of the third zone 310.

FIG. 3B is a plan view of a second illustrative data map 321 of surface roughness zones (308, 309, 310); within a hypothetical field. Like reference numbers in FIG. 3A and FIG. 3B indicate like features or elements. The data map 321 of FIG. 3B is similar to the data map 301 of FIG. 3A, except the data map 321 of FIG. 3B has transition regions 311 between different zones of respective surface roughness index ranges.

Within each transition region 311, the data processor 18, the steering gain module 59 and/or surface roughness index estimator 60 is adjusting or changing the gain setting from the target gain setting requirements of the previous zone that is just exited to the gain setting target requirements of next zone that is about to be entered. The longitudinal dimension (e.g., parallel or coincident to linear segments of rows 302) of the transition region 311 tends to vary with the speed of the vehicle, or its implement, in the direction of travel. The greater the ground speed of the vehicle, the shorter the longitudinal dimension of the transition region, and vice versa.

Figure 4:
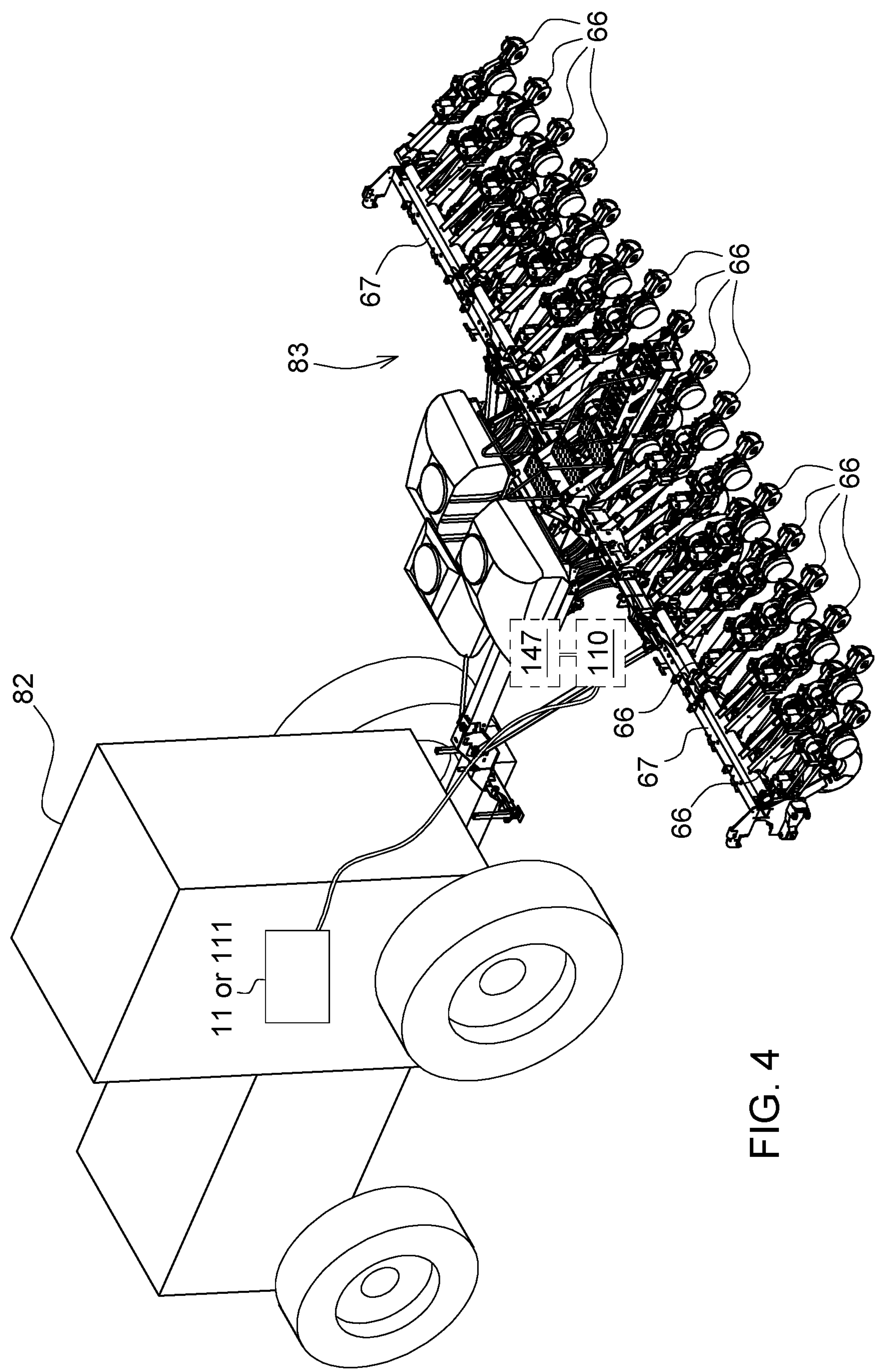
FIG. 4 is a perspective view of a off-road vehicle that is towing a planting implement of multiple row units with a steering gain setting of the vehicle that is adjustable in accordance with a map of surface roughness zones.

FIG. 4 is a perspective view of a off-road vehicle 82 that is towing a planting implement 83 of multiple row units 66, where the vehicle and/or its implement support an adjustable steering gain setting in accordance with a data map (301, 321) of surface roughness zones. Row units 66 are associated with the implement 83 that is coupled to the off-road vehicle 82.

Figure 5:
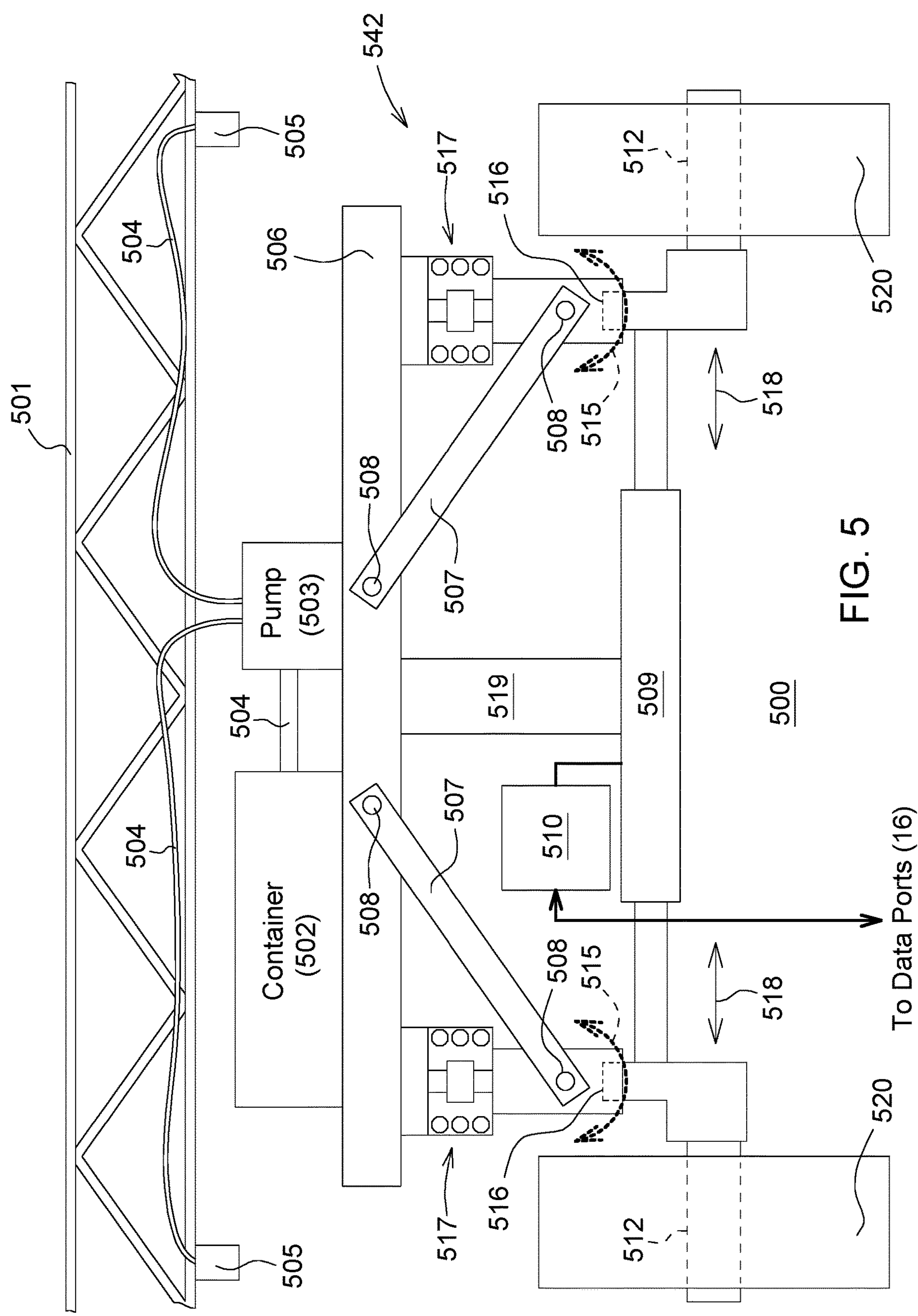
FIG. 5 is rear view of a towable sprayer implement with steerable wheels, where the implement can be towed by an off-road vehicle via a hitch.

FIG. 5 is rear view of a towable sprayer implement 500 with steerable wheels 520, where the implement 500 can be towed by an off-road vehicle via a hitch. The off-road vehicle (e.g., 82 in FIG. 4) can be coupled to the frame 506 or other structural member of the sprayer implement via a hitch, such as a three point pitch. The hitch may be associated with a wiring harness and electric connector between the implement steering controller 510 and the data port 16 or the data processing system 14. The implement steering controller 510 is electrically coupled to the implement steering actuator 509. The implement steering actuator 509 may comprise an electrohydraulic cylinder, a dual piston or dual chamber electrohydraulic cylinder, a linear motor, dual linear motors, an electric motor with a screw gear, dual electric motors with a screw gear, or the like. In one embodiment, the implement steering actuator 509 is secured to the frame 506 by one or more structural supports 519. The implement steering controller 510 is configured to generate, provide and communicate steering commands or steering data messages to the implement steering actuator 509.

In one embodiment, the implement steering actuator 509 is operably coupled to the wheel supports 514 for each rotatable wheel 520. Although the wheel supports 514 are illustrated as a hub connected to or integral with a vertical member, other configurations and variations of the wheel supports 514 fall within the scope of a steerable implement. At or near a lower end of the wheel support 514, a spindle or shaft 512 rotatably supports a wheel 520 and is associated with one or more radial bearings. At or near an upper end of the wheel supports 514, the wheel support 514 is rotatably coupled to an arm 516 for rotation 515 with respect to the arm 516 about a substantially vertical axis. In one configuration, the arm 516 and the wheel support 514 have one or more bearings (e.g., axial bearings and radial bearings). Accordingly, the implement steering actuator 509 may impart generally linear movement 518 about a substantially transverse axis via rods and/or a mechanical linkage, which facilitates turning or rotation 515 of the wheel support 514 and, hence, the wheel about the substantially vertical axis.

The arm 516 is linked to the frame 506 via supports 507 (e.g., linkage) and pivot points 508. An upper end of the arm 516 is coupled to a suspension assembly 517. As illustrated, the suspension assembly 517 comprises a coil spring and an shock absorber that are coaxially aligned, although other configurations are possible and fall within the scope of the suspension assembly 517. For example, the coil spring could be replaced by a torsion bar structure or a leaf spring. The suspension assembly 517 dampens vertical movement and allows the arm 516 to move up or down with respect to the frame member 506. Although the above implement steering system 542 is illustrated in the context of an implement 500, the off-road vehicle may incorporate a similar steering system where the implement steering controller 510 and the implement steering actuator 509 are replaced by the steering controller 40 and steering system 42, for example. Further, the above implement steering system 542 of the implement 500 can be used for an implement with two steerable wheels, or an implement with four steerable wheels, where the four steerable wheels essentially doubles the components of the implement steering system 542 and associated wheel suspension. The implement steering system 542 may refer collectively to the components below the frame 506 of the implement 500, for example.

In one embodiment, the sprayer portion of the implement 500 comprises the components above the frame 506. As illustrated in FIG. 5, the sprayer portion comprises a container 502 coupled to the pump 503 via a fluid line 504. The pump 503 is coupled via fluid lines 504 to one or more nozzles 505 that are spaced apart along the transverse length of a boom 501. The container 502 stores an aqueous solution, mixture or liquid, such as fertilizer, nutrients, pesticide, fungicide, herbicide, or other crop inputs for dispersing or dispensing via pump 503 to the nozzles 505 via fluid lines 504. In practice, a sprayer controller may be electrically coupled to electrohydraulic valves on each nozzle 505 to control the flow rate, pressure, pattern, activation state, or deactivation state (e.g., pulse-width modulation activation) of each nozzle or set of nozzles 505, where the sprayer controller is coupled to the data ports 16 or data processing system 14 on the off-road vehicle. The boom 501 is supported from the frame 506 by one or more structural members. The boom 501 may comprise a framework of members to reduce its weight and increase its structural strength, such as torsional strength and tensile strength. Although the implement 500 is illustrates as a towed sprayer, the implement may be configured as a planter with steerable wheels, or a cart (e.g., grain cart) or any other towable implement with at least two steerable wheels.

In an alternate embodiment of FIG. 5, a location-determining receiver 110 and a wireless communications device 147 are mounted on or in the implement 500 to provide position or motion data (e.g., implement velocity and acceleration) on the position of the implement with respect to one or more zones associated with corresponding surface roughness ranges.

The method and system of the disclosure is well-suited for accurate estimation and application of target steering gain setting for a vehicle and/or its implement to facilitate proper, precise and accurate steering of the vehicle and/or its implement to track a target path plan. For example, as the bumpiness or roughness of ground varies in certain zones or cells of a field or work site, the method and system supports automated and dynamic adjustment of the steering gain the vehicle and/or its, rather than relying upon the operator to manually adjust steering gain or steering commands in response to changing or variable conditions in the field or work site.

This document describes various illustrative embodiments which can be varied in many ways. Such variations are not to be regarded as a departure from the spirit and scope of illustrative embodiments, and all such variations or modifications as would be obvious to one skilled in the art are intended to be included within the scope of the claims.

The following is claimed:

1. A method and system for estimating surface roughness of a ground for an off-road vehicle to control steering, the method comprising:

detecting motion data of an off-road vehicle traversing a field or work site during a sampling interval, the motion data comprising ground speed of the off-road vehicle;

detecting pitch acceleration data of the off-road vehicle for the sampling interval;

detecting roll acceleration data of the off-road vehicle for the sampling interval; and determining a surface roughness index based on the detected motion data, pitch acceleration data and roll acceleration data for the sampling interval;

estimating zones with corresponding surface roughness index ranges within a field or work site based on the determined surface roughness index as a vehicle traverses or traversed the field or work site over multiple sampling intervals;

generating a graphical display that illustrates the estimated zones of corresponding surface roughness indexes or surface roughness index ranges within the field or work site; and displaying the graphical display to a user or operator of the off-road vehicle.

2. The method according to claim 1 further comprising:

determining a position of a vehicle, or its implement, in the field or in the work site with respect to the estimated zones of different corresponding surface roughness index ranges; and estimating a steering gain setting for the vehicle, its implement, or both, consistent with alignment and/or overlap of the determined position of the vehicle, its implement, or both, and the estimated zones.

3. The method according to claim 2 further comprising:

controlling an actuator to adjust the estimated steering gain setting for corresponding zones with a surface roughness index ranges for transitions or changes between different zone limits or zone thresholds.

4. The method according to claim 1 further comprising:

determining a position of a vehicle, or its implement, in the field or in the work site with respect to the estimated zones of different corresponding surface roughness index ranges; and controlling an actuator to decrease or decrement a present steering gain setting for a present zone with a present surface roughness index range that is greater than a previous range of a previous zone.

5. The method according to claim 1 further comprising:

determining a position of a vehicle, or its implement, in the field or in the work site with respect to the estimated zones of different corresponding surface roughness index ranges; and controlling an actuator to increase or increment the present steering gain setting for a present zone with a present surface roughness index range that is lesser than a previous range of a previous zone.

6. The method according to claim 1 further comprising:

collecting image data of the field or work site in a forward field of view of the vehicle;

estimating a visual surface roughness index for the collected image data within the field of view to establish a transition between different estimated steering gain setting zones; and prior to reaching a next transition region, estimating a next steering gain setting for the implement consistent with alignment and/or overlap of the determined position, the estimated zones and the established transition region.

7. The method according to claim 1 further comprising:

collecting image data of the field or work site in a forward field of view of the vehicle;

estimating a visual surface roughness index for the collected image data within the field of view to establish a transition between different estimated steering gain setting zones; and at the entrance point or beginning of the next transition region, controlling an actuator to increase or increment the next steering gain setting for one or more primary corresponding zones with a surface roughness index range that is greater than a limit of a previous zone threshold that the vehicle, or its implement, is exiting.

8. The method according to claim 1 further comprising:

collecting image data of the field or work site in a forward field of view of the vehicle;

estimating a visual surface roughness index for the collected image data within the field of view to establish a transition between different estimated steering gain setting zones; and at the entrance point or beginning of the next transition region, controlling an actuator to decrease or decrement the steering gain setting for one or more secondary corresponding zones with a surface roughness index range that is less than a limit of the previous zone threshold to transition between the different steering gain settings that the vehicle, or its implement, is exiting.

9. A system for estimating surface roughness of a ground for an off-road vehicle to control steering, the system comprising:

a motion sensor configured to detect motion data of an off-road vehicle traversing a field or work site during a sampling interval, the motion data comprising ground speed of the off-road vehicle;

a pitch sensor configured to detect pitch angular acceleration data of the off-road vehicle for the sampling interval;

a second sensor configured to detect roll angular acceleration data of the off-road vehicle for the sampling interval;

a surface roughness index estimator for determining a surface roughness index based on the detected motion data, pitch angular acceleration data and roll angular acceleration data for the sampling interval;

the surface roughness index estimator configured to estimate zones with corresponding surface roughness index ranges within a field or work site based on the determined surface roughness index; and a user interface configured to display the estimated zones of the corresponding surface roughness indexes or surface roughness index ranges with the field or work site to a user or operator of the off-road vehicle.

10. The system according to claim 9 further comprising:

a location-determining receiver for determining a position of a vehicle, or its implement, in the field or in the work site with respect to the estimated zones of different corresponding surface roughness index ranges; and an electronic data processor or steering gain module configured to estimate a steering gain setting for the vehicle, the implement, or both consistent with alignment and/or overlap of the determined position of the vehicle, the implement, or both, and the estimated zones.

11. The system according to claim 10 further comprising:

an implement steering controller configured to control a steering actuator to adjust the estimated implement steering gain setting for corresponding zones with a surface roughness index ranges for transitions or changes between different zone limits or zone thresholds.

12. The system according to claim 10 further comprising:

an electronic data processor or steering gain module configured to control an actuator to decrease or decrement a next steering gain setting for a corresponding zone with surface roughness index range that is greater than a limit of a previous zone threshold.

13. The system according to claim 10 further comprising:

an electronic data processor or steering gain module configured to control an actuator to increase or increment a next steering gain setting for a corresponding zone with surface roughness index range that is less than a limit of a previous zone threshold.

14. The system according to claim 9 further comprising:

an imaging system for collecting image data of the field or work site in a forward field of view of the vehicle;

a visual surface roughness estimator configured to estimate a visual surface roughness index for the collected image data within the field of view to establish a transition between different estimated steering gain setting zones; and prior to reaching a next transition region, an electronic data processor or steering gain module configured to estimate a next steering gain setting for the implement consistent with alignment and/or overlap of the determined position, the estimated zones and the established transition region.

15. The system according to claim 9 further comprising:

an imaging system for collecting image data of the field or work site in a forward field of view of the vehicle;

a visual surface roughness estimator configured to estimate a visual surface roughness index for the collected image data within the field of view to establish a transition between different estimated steering gain setting zones; and at the entrance point or beginning of the next transition region, controlling an actuator to increase or increment the next steering gain setting for a corresponding primary corresponding zone with a surface roughness index range that is less than a limit of a previous zone threshold that the vehicle, or its implement, is exiting.

16. The system according to claim 9 further comprising:

collecting image data of the field or work site in a forward field of view of the vehicle;

estimating a visual surface roughness index for the collected image data within the field of view to establish a transition between different estimated steering gain setting zones; and at the entrance point or beginning of the next transition region, controlling an actuator to decrease or decrement the steering gain setting for a corresponding secondary zone with a surface roughness index range that is greater than a limit of a previous zone threshold that the vehicle, or its implement, is exiting to transition between the different steering gain settings.

* * * * *